United States Patent [19]

Malcolm

[11] 4,306,284
[45] Dec. 15, 1981

[54] OPTIMIZER INDUSTRIAL TEST UNIT

[75] Inventor: Donald H. Malcolm, Brooklyn Center, Minn.

[73] Assignee: Optimizer Control Corporation, Burnsville, Minn.

[21] Appl. No.: 66,418

[22] Filed: Aug. 14, 1979

[51] Int. Cl.³ .................. G05B 13/02; G06F 15/46
[52] U.S. Cl. .................................. 364/148; 123/416; 123/487; 364/431.01
[58] Field of Search .............. 364/105, 431, 106; 123/32 EA, 32 EB, 32 EC, 148 E, 416, 487

[56] References Cited

U.S. PATENT DOCUMENTS

| | | | |
|---|---|---|---|
| 3,622,767 | 11/1971 | Koepcke | 364/105 X |
| 3,781,533 | 12/1973 | Barnstone et al. | 364/105 |
| 3,996,452 | 12/1976 | Schulze et al. | 364/105 |
| 4,038,526 | 7/1977 | Eccles et al. | 364/105 |
| 4,130,863 | 12/1978 | Schweitzer et al. | 364/105 |
| 4,151,588 | 4/1979 | Hammer | 364/105 X |
| 4,189,765 | 2/1980 | Kotalik et al. | 364/103 X |

*Primary Examiner*—Joseph F. Ruggiero
*Attorney, Agent, or Firm*—Orrin M. Haugen; Thomas J. Nikolai

[57] ABSTRACT

An electronic test instrument for facilitating the analysis of a machine's response to cyclic perturbations in one of its control parameters and for adjusting the control parameter based upon the observed response so as to optimize the machine's performance. The instrument permits manual control over the rate and magnitude of the perturbation, the amount of bias, i.e., the deviation of the actual operating point from the optimum, and the upper and lower limits between which correction is permissible. To prevent undue hunting of the control parameter about an operating point, the instrument includes a buffering network that requires that the system call for a predetermined number of control parameter adjustments in a given direction before an actual correction will be effected. The number is selectable by manually settable switches.

7 Claims, 21 Drawing Figures

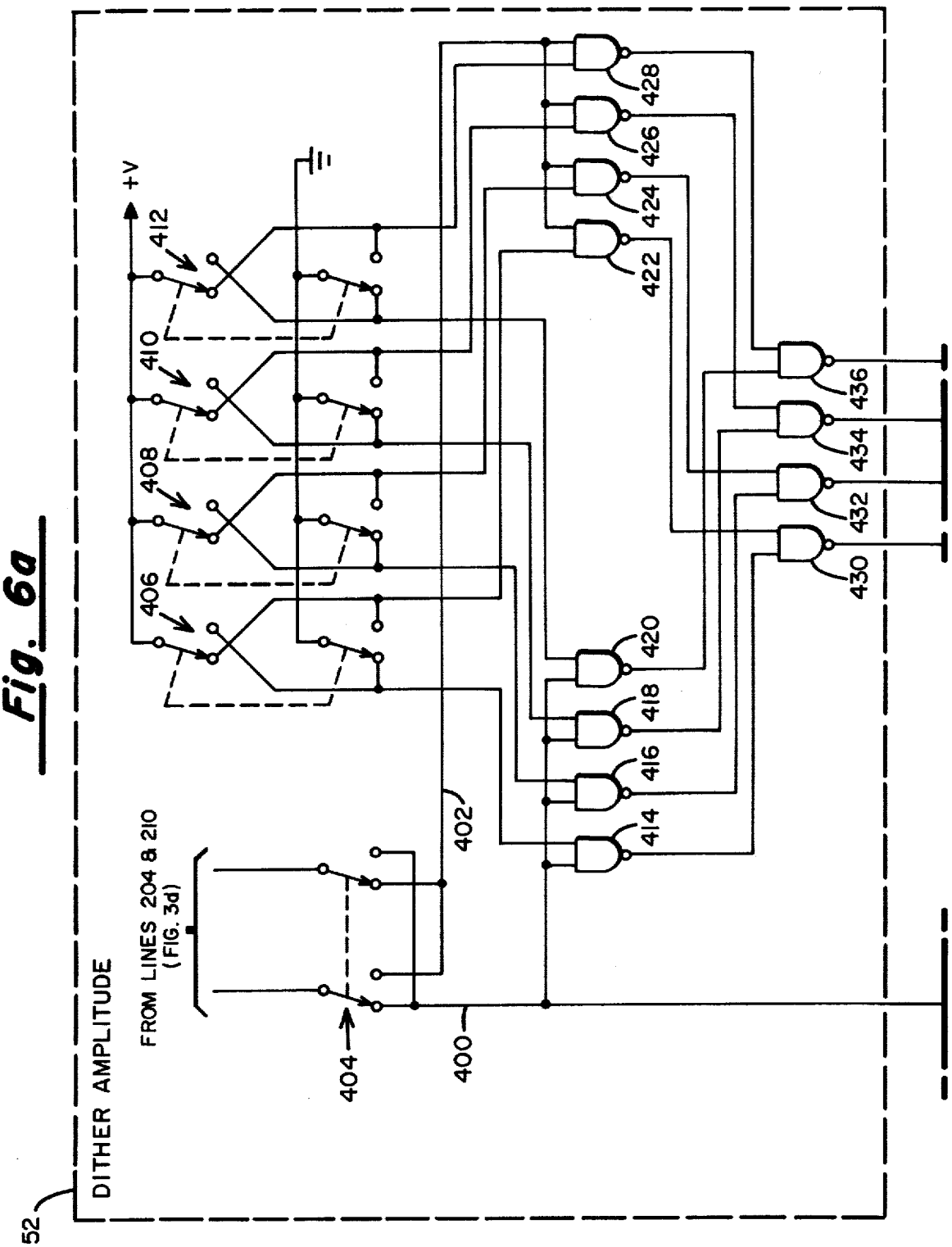

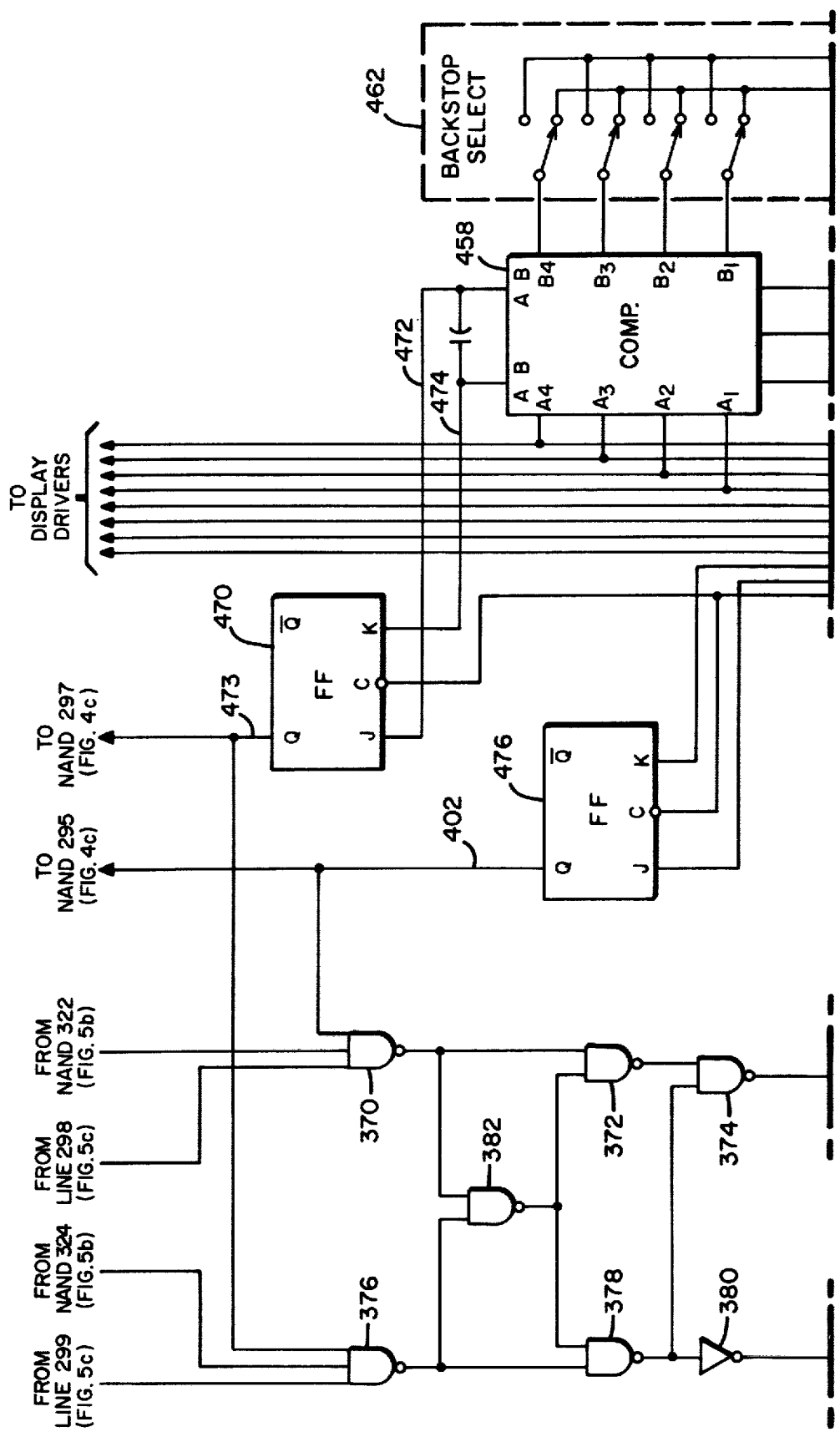

OPTIMIZER INDUSTRIAL TEST UNIT

BACKGROUND OF THE INVENTION

I. Field of the Invention

This invention relates generally to apparatus for optimizing the performance of energy consuming machines or systems and more specifically to an improved digital electronic device for demonstrating the effect of the optimization device on system performance by allowing selective control and manual intervention over the operation of the device.

II. Description of the Prior Art

Dr. Paul H. Schweitzer has made a number of inventions relating to controllers for use with internal combustion engines or other types of energy consuming systems wherein a given control parameter, such as air/fuel ratio, spark setting or other setting, is perturbated and the resulting affect on the machine or system performance is measured for producing a control signal which is then used to adjust the parameter control setting in a manner tending to improve the system's performance. In this regard, reference is made to the Schweitzer U.S. Pat. No. 3,142,967 and the Schweitzer et al U.S. Pat. Nos. 4,026,251 and 4,130,863 which are hereby incorporated by reference for their teaching of the basic servo control philosophy and various alternative implementations ranging from electromechanical to digital electronic.

The present invention is related to the subject matter of the aforereferenced Schweitzer inventions and is specifically directed to a test instrument which may be coupled to an energy consuming system for allowing manual control and intervention over various operating parameters of the system and the control mechanism itself. For purposes of illustration, the present invention will be considered in conjunction with its use with internal combustion engines, e.g., automobile engines, it being understood, however, that the optimization scheme employed is equally applicable to a wide variety of other energy consuming systems.

To demonstrate the efficacy of engine performance optimization using a dither principle, the present invention has been devised whereby it may be coupled to the ignition system of an internal combustion engine and receive, as its input, pulses from the breaker points, as well as pulses from a transducer which are proportional in number to the engine's output shaft speed. Its output is a firing pulse and the system of the present invention permits the time of occurrence of this firing pulse to be adjusted in an advance or retard direction with respect to the top dead center position, such that the system continually seeks a point corresponding to the minimum advance that gives the best torque output, hereinafter referred to as MBT.

As is pointed out in the aforereferenced Schweitzer et al '863 Patent, it is sometimes desirable for an engine to operate at other than MBT. Specifically, at MBT, some engines are found to exhibit knock or the NOX emissions may be excessive. Accordingly, it may be desirable to introduce a predetermined degree of "bias" whereby the system will be made to operate with a timing different from MBT. The apparatus of the present invention permits both a coarse and a fine adjustment over the amount of bias so that the overall effect of the bias on system performance can be studied.

In that the optimizer system concept depends upon predetermined perturbations of a engine's control parameter, e.g., spark setting, throttle position, etc., it is desirable to be able to selectively adjust both the magnitude of the perturbation as well as its frequency. In the test instrument of the preferred embodiment, the automotive engineer or technician may, through the use of manually settable switches, adjust these parameters of the dither or perturbation.

It has further been found in the analysis of certain engine types that the response curve of output torque or speed versus spark setting is fairly flat and, as a result, the MBT point is ill-defined. The optimizing concept causes small step-by-step changes in a parameter setting until further changes in the same direction result in a reduction in output performance. With very flat curves, MBT may go undetected and the repeated increments of correction could result in the timing entering a misfire zone associated with an adjacent cylinder. To obviate this problem, the device of the present invention permits both a frontstop and a backstop value to be entered into the electronics, such that correction can only occur in the range between the frontstop value and the backstop value. Again, the exact positioning of these frontstop and backstop values with respect to a reference point is selectable by the operator.

Because of the nature of the device being controlled (an internal combustion engine), inherent "noise" oscillations may cause problems relative to the establishment of a correction factor for the control parameter. As such, a means of filtering these noise oscillations may be expedient. The present invention incorporates circuitry, referred to as the digital buffer, which functions to inhibit any corrections, either positive or negative, until a predetermined number of successive correction steps in the same direction have occurred. This predetermined number is established by the manually operable digital buffer switches on the test instrument.

Another feature found to be desirable in an instrument of the type under consideration is so-called manual step correction. Switches are provided whereby the operator, by successively actuating the switches, may apply incremental corrections to the engine's control parameter. By further including a digital display panel, the operator can, through the manipulation of the manual step correction switches, track or plot the performance characteristics of the engine under control of the optimizer unit.

OBJECTS

It is accordingly the principal object of the present invention to provide a new and improved electronic test instrument for analyzing the performance of an energy consuming machine under control of an optimizer-type servo controller.

Another object of the invention is to provide in a test instrument of the type described apparatus for permitting operator control over a wide number of operating conditions.

Yet another object of the invention is to provide an electronic test instrument for monitoring the operation of an internal combustion engine whose firing time is under the control of an operating point seeking servo system.

A further object of the invention is to include in the test instrument means for establishing upper and lower limits in which automatic servo correction is permissible.

Yet a further object is to provide in a system of the type described apparatus for minimizing the possibility for improper operation due to random noise or hunting.

A still further object of the invention is to provide a test instrument for use with a optimizer-type servo controlled engine which permits manual step operation to facilitate observation of changes in machine performance.

These and other objects and advantages of the invention will become apparent to those skilled in the art from the reading of the following detailed description of the preferred embodiment, as illustrated in the accompanying drawings in which:

DESCRIPTION OF THE PREFERRED EMBODIMENT

In order to understand the overall construction and mode of operation of the optimizer test instrument, consideration will first be given to the block diagram of FIG. 1 and, following that description, will be an explanation of the specific implementation of the hardware or circuitry used to implement the various functional blocks set out in the functional block diagram. Also, it is to be understood that the present invention may be used in conjunction with a variety of energy consuming systems, but for the purpose of explaining its operation, it will be explained in conjunction with an internal combustion engine. Further in this regard, it is possible to apply the optimizing arrangement to a number of machine control parameters on such an engine. For example, control may be maintained over the throttle position, the fuel injection process, or the ignition timing. The instant invention will be described with reference to this latter control parameter.

The chief function of the optimizer unit is to utilize information obtained from transducers associated with the engine control parameter and the output shaft to continuously compute an optimally timed firing pulse for all conditions of rpm and loading of the engine. It is implemented as a digital feedback control system in which a digital error signal is developed which is indicative of the direction that timing should be changed for more optimum operation. Incremental adjustments or perturbations termed "dithering" are made to the timing to continuously null this error signal. That is to say, the error signal is developed by means of dithering in which small changes to the timing are made on a periodic basis and the response of the engine to the dithering of its control parameter is sensed.

Figure 1:
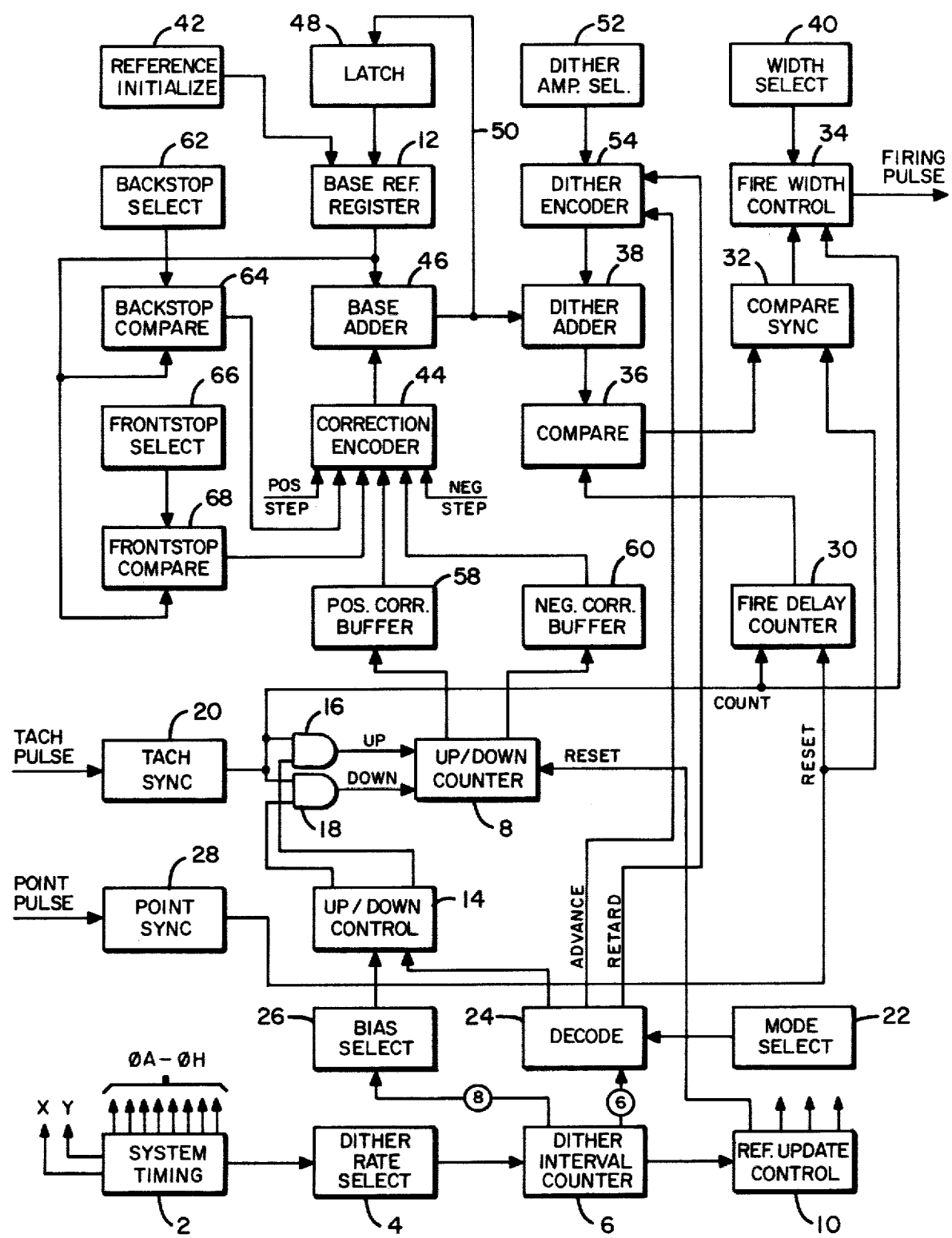
FIG. 1 comprises a block diagram representation of the optimizer test unit.

With reference to the block diagram of FIG. 1, the System Timing 2 consists of an oscillator and logic circuits to form a multiphase clock which is used to control the operation of the system. To avoid undue complexity in the block diagram of FIG. 1, the manner in which the timing signals are applied to the remaining block in the diagram is not specifically illustrated, but this will become apparent when the detailed implementation of the system is described. In any event, timing pulses are applied to a Dither Rate Select circuit 4, which is a selectable binary divider designed to divide down the output from the system timing 2 to establish a selectable rate at which the Dither Interval Counter 6 will be incremented. The Dither Interval Counter 6 may be a 14-bit binary counter and it is used to define the interval for which the engine's timing will be advanced and retarded, as well as the intervals for which an Up/Down Counter 8 will be counted up or down.

At the end of each dither interval, the Reference Update Control circuit 10 issues the timing pulses required to turn the sensed correction, or error signal, into an update of the Base Reference Register 12 which, in turn, exercises control over the engine timing.

The Up/Down Control circuit 14 determines the fraction of the dither interval during which either coincidence circuit 16 or 18 is enabled to allow tach or celsig pulses from the engine transducer to reach the up/down counter 8 by way of the Tach Sync circuit 20. That is to say, the Up/Down Count Control circuit 14 determines the portion of the dither interval in which the counter 8 is advanced and decremented by the tach pulses.

The various operating modes of the optimizer test unit require that a degree of flexibility be provided for the Up/Down Count Control 14. The Mode Select circuit 22 determines the manner in which the most significant 6 bits of the Dither Interval Counter 6 are decoded. Several options of decoding in the circuit 24 can be selected to provide various phase relationships between the up/down count sequence and the advance/retard dither sequence. It is also found desirable to introduce a selectable degree of asymmetry between the up and down count phases in the counter 8. This asymmetry is referred to herein as "bias" and the circuit 26 can cause the system to operate a predetermined degree either in advance or retard of the so-called MBT operating point. The acronym MBT stands for the minimum advance of timing for producing the best (maximum) torque. The amount of bias is determined by decoding the 8 least significant bits of the Dither Interval Counter 6 and using this output to condition the Up/Down Control circuit 14.

The point synchronization (point sync) circuit 28 detects the leading edge of each point pulse and places it in synchronization with the over-all system timing. The Tach Sync circuit 20 performs this same function with respect to the leading edge of each tachometer pulse. The output of the Point Sync circuit 28 is used to reset the Fire Delay Counter 30 and the Compare Sync circuit 32.

The output of the Tach Sync circuit 20 is used to increment or decrement the Up/Down Counter 8 as dictated by the Up/Down Control circuit 14, increment the Fire Delay Counter 30 and provide timing for the Fire Width Control circuit 34.

The basic operation of the optimizer test unit will now be explained with continued reference to the block diagram of FIG. 1.

Each point pulse serves as a timing reference for the system and resets the fire delay counter 30. Each tach pulse, which represents the basic unit of timing for the system, causes the Fire Delay Counter 30 to be incremented. The Compare circuit 36 compares the output of the Fire Delay Counter 30 with the output of the Dither Adder circuit 38. The output of this adder is a quantity which may be referred to as the "Dithered Reference Count". When the count in the Fire Delay Counter 30 is equal to or exceeds the Dithered Reference Count, the output of the compare circuit 36 initiates the Compare Sync circuit 32. The output of the Compare Sync circuit 32, in turn, initiates the Fire Width Control circuit 34, thereby initiating the firing pulse delivered to the engine. The width of the resulting firing pulse is determined by the count selected by the Width Select circuit 40. That is, when the number of tach pulses received equals the count selected by the Width Select circuit 40, the firing pulse is terminated.

In normal operation, then, the time delay between a point pulse and a subsequent firing pulse is determined by the Dithered Reference Count. If under an abnormal condition of operation the compare pulse is missed, the Compare Sync circuit 32 permits the next point pulse to initiate the firing pulse. This precautionary measure permits the engine to continue running, though at a sub-optimum level of performance.

The Base Reference Register 12 may, for example, be an 8-bit register adapted to contain a count corresponding to the optimum delay between the point pulse and the firing pulse. Upon power-up, the Reference Initialize circuit 42 functions to load the Base Reference Register 12 with a binary count of 11000000, which corresponds to decimal 192. Although this may not be an optimum value, it is a value which falls within the dynamic range of the feedback system and thus can be adjusted through the operation of the servo system to the optimum value.

The Correction Encoder circuit 44 encodes the correction command to the required count. The specific manner in which correction commands are generated will be described later. Suffice it to say for now, if the reference count is too low, a positive correction command will be generated. This will result in an output from the Correction Encoder circuit of +1. The output of the 8-bit Base Adder 46 will thus be the value stored in the Base Reference Register 12, incremented by +1, and this count is presented to the input of the 8-bit Latch circuit 48 via the lines in cable 50.

At the end of each dither cycle, the Reference Update Control circuit 10 issues timing pulses which first latch the data from the Base Adder 46 into the 8-bit latch 48 and then subsequently latch that data into the Base Reference Register 12. In this manner, each dither cycle which generates a positive correction causes the Base Reference Count in the register 12 to be incremented by one.

In a similar fashion, a negative correction command will cause the Correction Encode circuit 44 to generate a binary count of 11111110 which corresponds to a −1. As such, each dither cycle in which a negative correction is generated causes the contents of the Base Reference Register 12 to be decremented by one. When the optimum value of the reference count has been reached, there will be no correction and the output of the Correction Encoder 44 will be zero, causing the reference count in the Base Reference Register 12 to remain unchanged.

Continuing with a description of the system operation with reference to the block diagram of FIG. 1, the Dither Amplitude Selection circuit 52 may consist of four toggle switches which may be selectively opened and closed to establish a dither amplitude count between the ranges of 0 to 15. This count is presented to the Dither Encoder circuit 54. The most significant bit of the Dither Interval Counter 6, in conjunction with the mode select switches 22, determines whether the dither is in an advance or a retard phase. When the dither is in the retard phase, the Dither Amplitude Count from circuit 52 is passed through the Dither Encoder 54 and presented, without modification, to the Dither Adder network 56. Thus, the output of the Dither Adder 38 is the Base Reference Count plus the Dither Amplitude.

When the dither is in the advance phase, the Dither Encoder 54 complements the Dither Amplitude Count as established by the Dither Amplitude Selection switches 52. In this case, the output of the Dither Adder 38 will be the Base Reference Count minus the Dither Amplitude Count. At the end of each dither interval, the state of the Up/Down Counter 8 is sensed. If the count at this time is zero, it indicates that there have been an equal number of up and down counts and the timing is therefore at the desired optimum value. Thus, no correction signal will be issued. However, if the residual count remaining in the counter 8 at the conclusion of the dither cycle is positive, it indicates that there has been an excess of up-counts and indicates that a positive correction is required. This correction is stored in the Positive Correction Buffer circuit 58.

The Positive Correction Buffer 58 requires that a predetermined number of positive corrections be sequentially sensed without an intervening negative correction before such correction signals will be passed onto the Correction Encoder circuit 44. The number is determined by the Positive Correction Buffer Selection Switches (not shown in FIG. 1).

In a similar fashion, whenever a negative correction is sensed, the Positive Correction Buffer 58 is reset. The Negative Correction Buffer 60 must also sense a specific number of negative correction signals from the Up/Down Counter 8 without an intervening positive count before such correction signals can be passed onto the Correction Encoder 44 and this predetermined number is also established by a set of manually operable switches (not shown). A positive correction signal resets the Negative Correction Buffer 60.

The form of correction buffering explained above results in the suppression of noise induced by insignificant fluctuations in the engine performance and quantizing errors introduced by the digital counting method. Thus, the buffered correction outputs will be truly a correction signal required to re-optimize the Base Reference Count following a change in an engine control parameter.

In addition to the automatic mode of operation outlined above, it is possible to manually alter the Base Reference Count. In this regard, switches (not shown in FIG. 1) coupled to the correction encoder 44 may be used to manually introduce a positive step or a negative step correction into the Encoder 44. Each switch closure thus results in a change of one count in the direction indicated by the particular switch actuated, i.e., positive step or negative step.

During certain abnormal transient conditions, it is possible that the sensed corrections would be invalid and would change the reference count away from its optimum value. Like all servo systems, the optimizer unit of the present invention has a specific dynamic range over which the feedback correction can operate. In recognition of this fact, the system further includes so-called backstop and frontstop circuits to assure that the reference count is never allowed to go outside of the dynamic range and, thus, the Optimizer is able to recover from these abnormal transient conditions. The backstop select circuit 62 comprises a set of 8 switches which are set to a position corresponding to the upper limit desired for the Base Reference Count. This binary value is presented to the Backstop Compare circuit along with the Base Reference Count from the Base Reference Register 12. Whenever the Base Reference Count is equal to or greater than the backstop limit from the switches 62, a negative correction is forced into the Correction Encoder circuit 44. Because simultaneous positive and negative corrections negate one another, it assures that the Base Reference Count will either remain at the limit or will be decremented until it is less than the value of the backstop limit setting. The Frontstop Select 66 and the Frontstop Compare circuits 68 function in a similar manner to force a positive correction whenever the Base Reference Count is equal to or less than the Frontstop limit selected by the circuit 66.

Now that the overall system organization and operation has been explained, consideration will be given to the specifics of the circuits used to implement the various apparatus represented by the block diagram of FIG. 1.

System Timing

Figure 2:
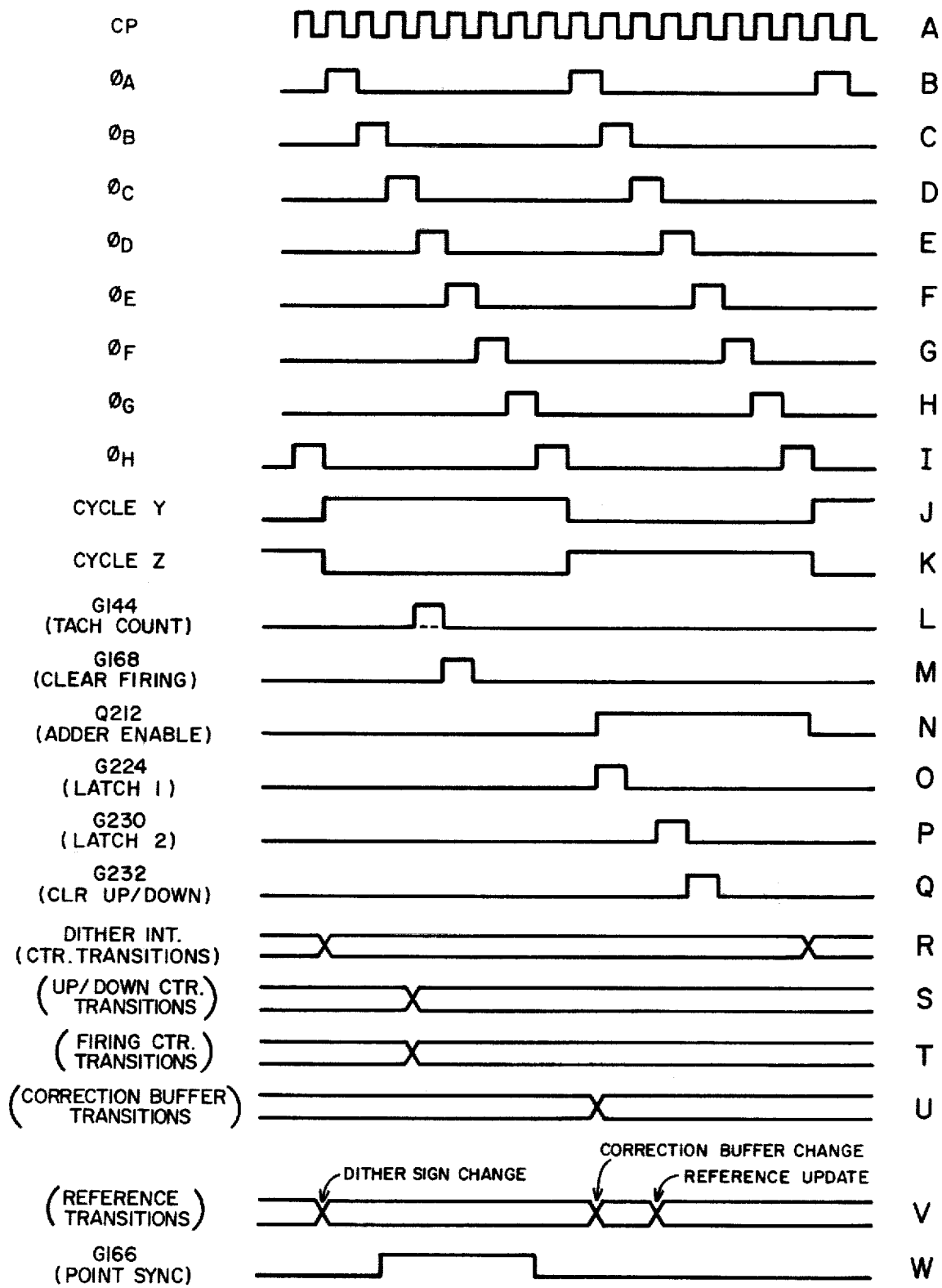
FIG. 2 is a timing diagram useful in explaining the sequence of operation of the system.
Figure 3:
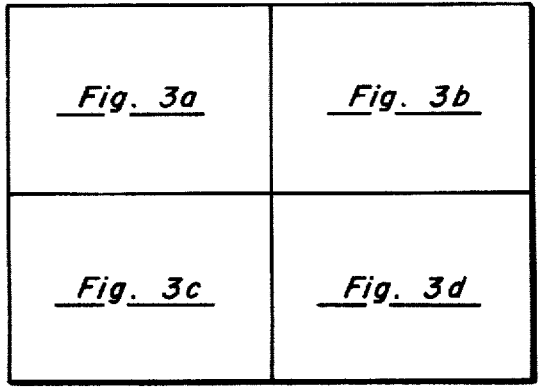
FIGS. 3a through 3d, when arranged as shown in FIG. 3, show by means of a logic diagram the circuitry for implementing certain of the modules shown in the system block diagram of FIG. 1.
Figure 4:
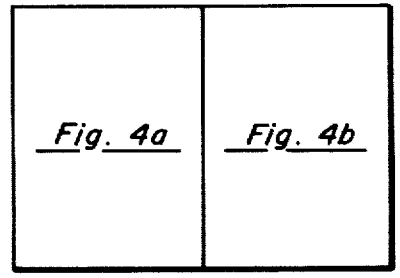
FIGS. 4a and 4b, when arranged as shown in FIG. 4, comprise a logic diagram for implementing still other modules set out in the block diagram of FIG. 1.
Figure 5:
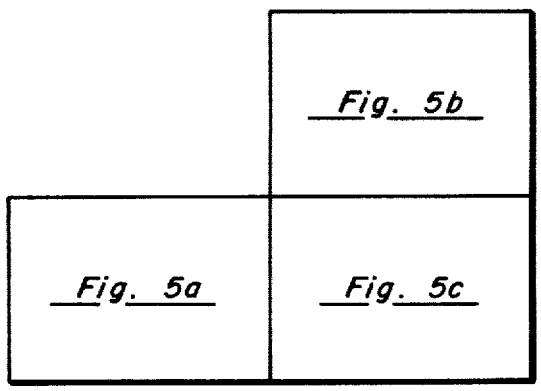
FIGS. 5a through 5c, when arranged as shown in FIG. 5, depict by means of a logic diagram the circuits implementing the Up/Down Counters, the Correction Buffers and the Correction Control circuits shown in the block diagram of FIG. 1.
Figure 3A:
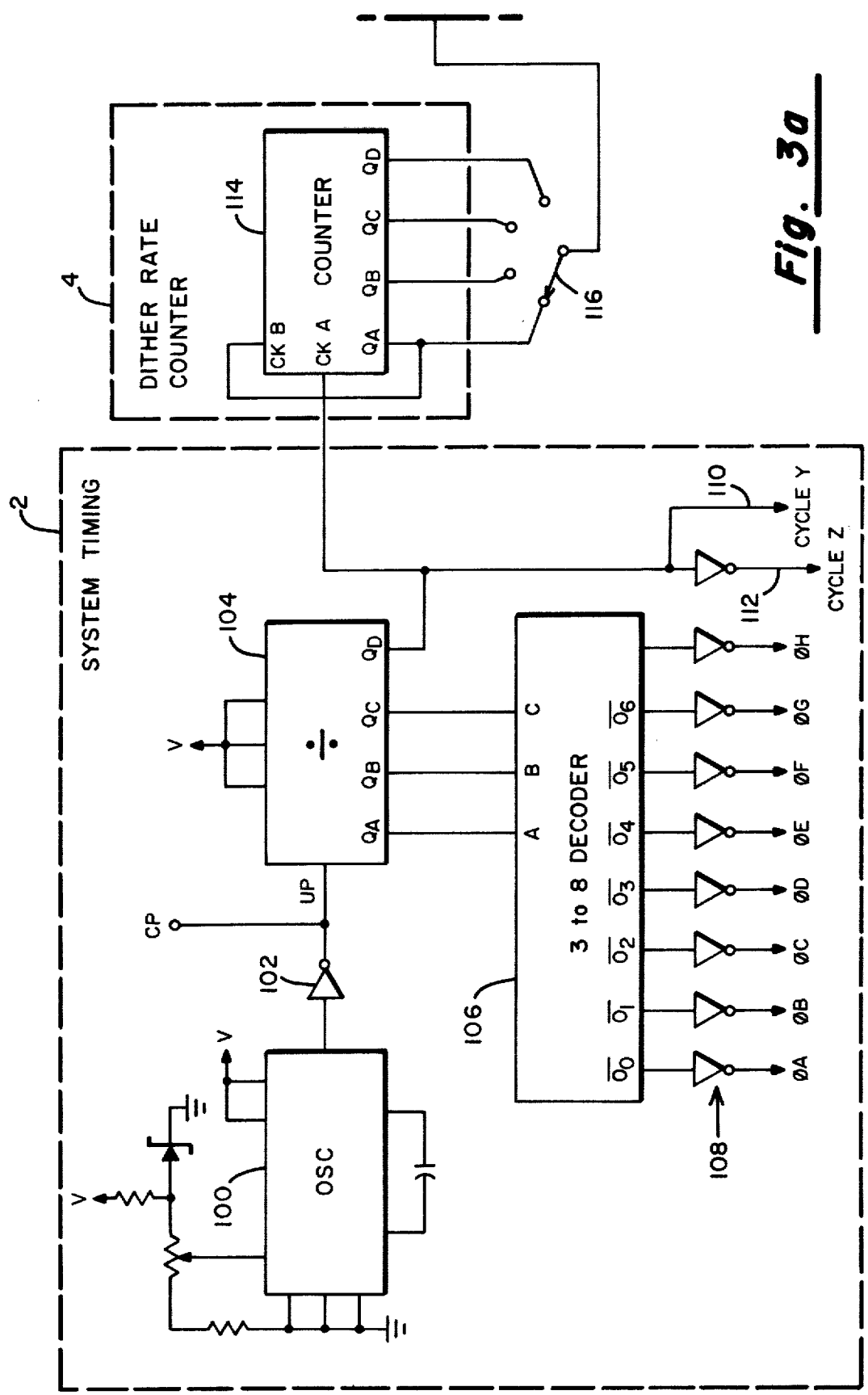

With reference to the timing diagram of FIG. 2 and the logic diagram of FIG. 3a, the overall system timing for the Optimizer test instrument is derived from an oscillator 100 which may, for example, comprise an integrated circuit with external components causing it to operate at a rate of about 8.39 MHz. The output from the oscillator 100 is buffered by an inverter 102 to form clock pulses, $C_p$, at its output and to the count input of a multistage digital counter 104, which functions as a frequency divider and establishes specific timing signals through a 3-to-8 decoder or translator 106. Depending upon the binary value contained within the counter 104, the 8 output lines $\overline{O}_0$ to $\overline{O}_7$ will be successively energized and the resulting stage outputs will be inverted by the inverters 108 to thereby define 8 separate timing phases labeled Phase A through Phase H, respectively. The Clock Pulses (CP) and the eight phase signals are illustrated as waveforms A through I in the timing diagram of FIG. 2. The output from the highest order stage of the counter 104 appearing on the conductor 110 and the inverted version thereof appearing on conductor 112 alternate on successive cycles to define two types of timing cycles. Specifically, when the signal on conductor 110 is high, the system is considered to be operating in its Y-cycle, whereas when this signal is low, that appearing on conductor 112 is high and defines the so-called Z-cycle, as illustrated by waveforms J and K of FIG. 2. As will be explained more fully hereinbelow, logical combinations of the Phase A through Phase H signals and the Y and Z cycle signals are used to control the overall operation of the instrument.

The output from the highest order stage of the frequency divider 104 is applied to the count input terminal of a further frequency divider 114 which forms a part of the Dither Rate Select circuit 4 of FIG. 1. The frequency divider or counter 114 may descriptively be termed the Dither Rate Counter and the output from the individual stages thereof are coupled through a Dither Rate Switch 116 to the count input terminal, CKA, of a still further digital counter 118 corresponding to the Dither Interval Counter 6 of FIG. 1. Through selective positioning of the manually operable Dither Rate Switch 116, dither rates of 262, 131, 65.5 or 32.8 KHz pulses, respectively, can be obtained from the Dither Rate Counter 114 and applied to the Dither Interval Counter 118.

The outputs from the individual stages of the Dither Interval Counter as well as the inverted or complemented version thereof are made to appear at the contacts of a plurality of single pole double throw manually operable switches which form part of the Bias Select network 26 of FIG. 1. As is illustrated, by positioning these switches it is possible to apply the output from the Dither Interval Counter either directly or in inverted form to a translator network indicated generally by numeral 515 in FIG. 3d. With the switch 116 in the position shown, the Dither Interval Counter 6, including integrated circuit counters 118 and 119 is clocked at a 262 KHz rate, thus resulting in a 16 Hz dither rate, corresponding to a 62.5 millisecond dither interval. Other switch positions of the switch 116 will result in dither intervals of 125, 250 and 500 milliseconds, respectively.

Tach Synchronization

Figure 3B:
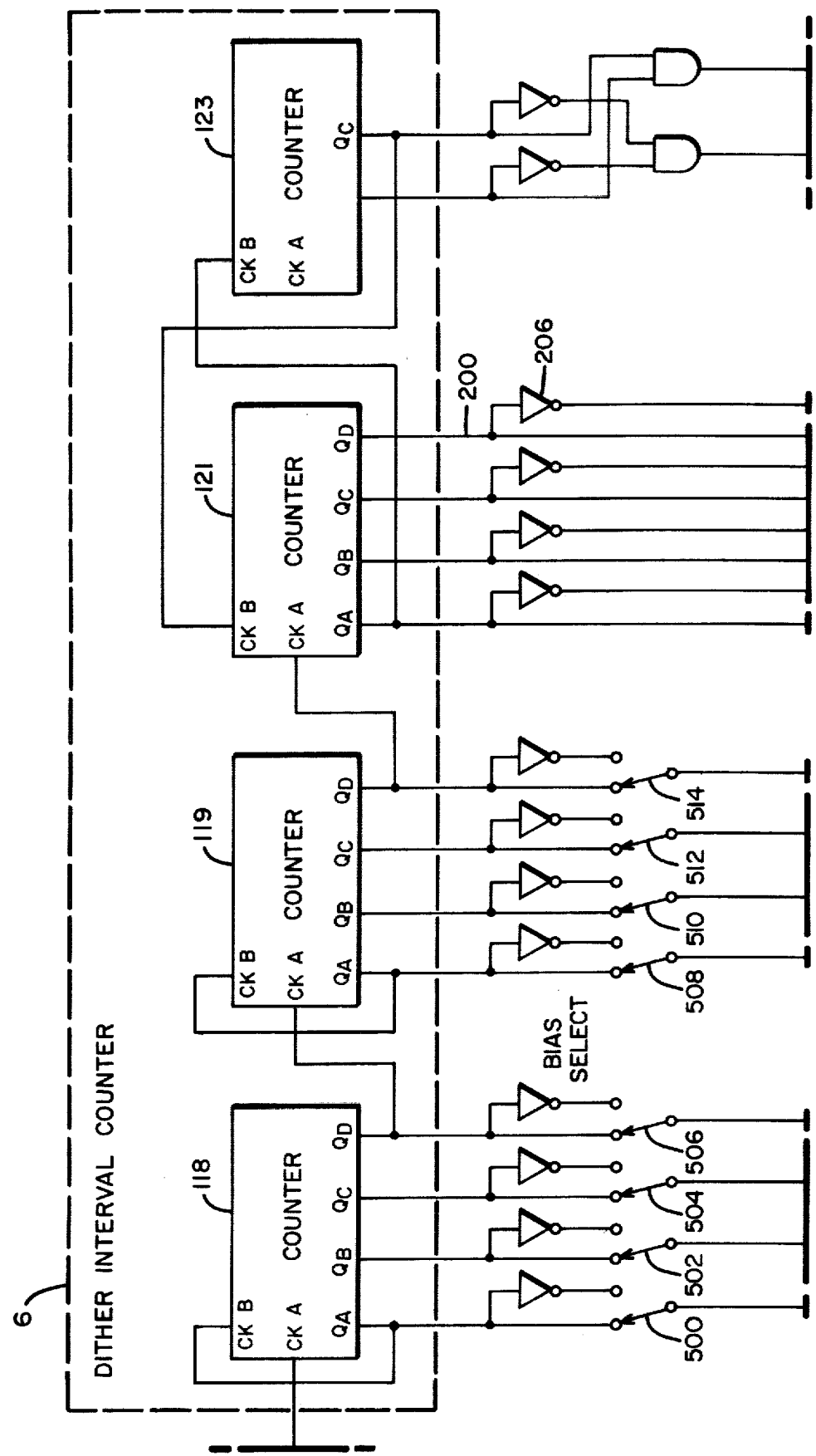
Figure 3C:
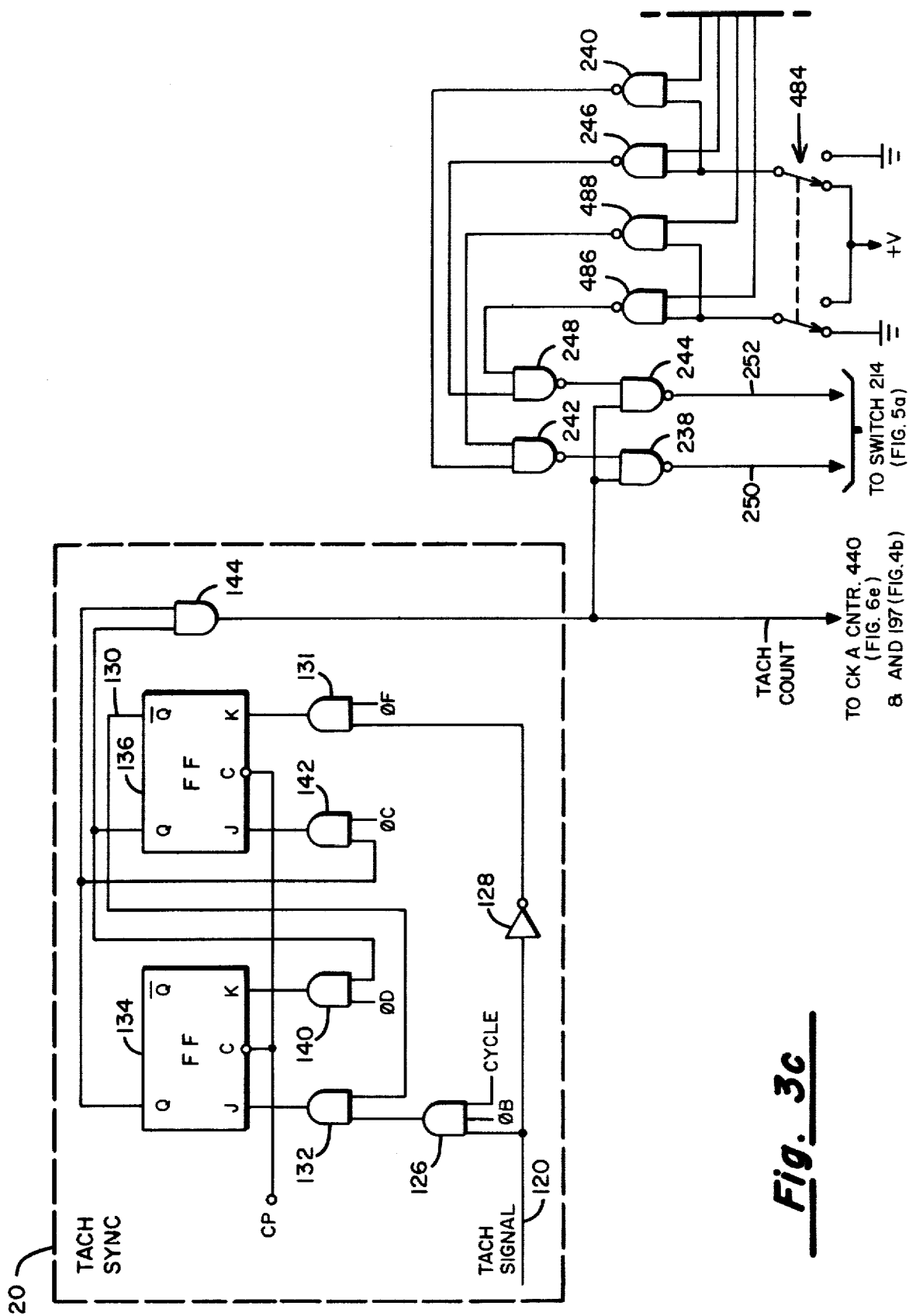

The tach pulses are signals derived from a transducer which is coupled to the engine in such a fashion that the output pulses are produced at a rate that is proportional to engine shaft speed. Typically, in an automobile environment, the tach pulses may be obtained from a magnetic transducer associated with a notched wheel attached to the alternator drive pulley. The exact numerical relationship between the engine speed and the tach pulses is only secondary, the important or primary requirement being that the relationship is consistent. The function of the Tach Synchronization circuit shown in FIG. 3c is to convert the leading edge of a tach signal into a single count pulse and, further, to synchronize this pulse such that it occurs at a time when the Base Reference Count in the system is stable. Specifically, tach signals are supplied from the engine transducer (not shown) to the line 120 and are applied as a first input to an AND gate 126 which also receives as inputs timing signals from the System Timing network 2. The tach signal on line 120 is also connected by way of an inverter 128 to a first input of a further NAND gate 130. The output from gate 126 connects through a further NAND gate 132 whose output is coupled to the J terminal of a JK flip-flop 134. The output from AND gate 130 is connected to the K terminal of a second JK type flip flop 136 and the complimentary output Q thereof is coupled by a conductor 138 to the second input of the AND gate 132. Connected to the K-terminal of the flip-flop 134 is a further AND gate 140 which is connected to receive a phase D timing signal at one of its inputs and the Q output from the flip flop 136 at its other input. In a somewhat similar fashion, AND gate 142 has its output connected to the J terminal of the flip-flop 136 and a first input thereof is coupled to the Q output of the flip-flop 134. The second input to AND gate 142 comes from the system timing (Phase C). In operation, then, a positive going tach signal on line 120 partially enables AND gate 126 and also disables AND gate 130 by way of inverter 128. On Phase B of cycle Y, the AND gate 126 is fully enabled and because the JK flip-flop 136 is reset, AND gate 132 is also enabled. Thus, at the next clock pulse, the flip-flop 134 will set. On Phase C of cycle Y, AND gate 142 is enabled, causing the flip-flop 136 to set. Then, on Phase D of cycle Y, AND gate 140 is enabled, causing the flip-flop 134 to reset. AND gate 132 prevents the flip-flop 134 from again being set until such time as the flip-flop 126 is reset. This occurs on Phase F of cycle Y following the trailing edge of the tach signal thus enabling AND gate 130. The effect of this action is to generate a single tach count pulse at the output of AND gate 144 on the next cycle Y, Phase B pulse following the leading edge of the tach signal.

Point Synchronization

The Point Synchronization circuit 28 on the block diagram of FIG. 1 may be implemented in the manner now to be described with reference to FIG. 4a of the drawings. The purpose of the Point Synchronization circuit is to convert the leading edge of the point signal into a single synchronized pulse which can be used to control the firing counters and the overall firing sequence. The Point Synchronization circuit includes the flip-flops 146 and 148, the gates 150, 152, 154 and 156 associated with the J-K input terminals of these flip-flops and the further AND gate 158. The signal from the points is applied to the AND gate 158 by way of conductor 160 and at Phase A of cycle Y this gate 158 is enabled to provide a first input to the AND gate 150 whose second input comes from the Q output of flip-flop 148 by way of a conductor 162. The gates 152, 154 and 156 are partially enabled by Phase G, Phase B and Phase F timing signals, respectively. Initially, the flip-flops 146 and 148 are reset. The leading edge of a point signal on line 160 partially enables AND gate 158 and disables AND gate 156 by way of inverter 164. On Phase A of cycle Y, when AND gate 158 is enabled, AND gate 150 will also be enabled in that the JK flip-flop 148 is reset at this time. Thus, on the next clock pulse, flip-flop 146 sets. On Phase B of cycle Y AND gate 154 is enabled, thus setting flip-flop 148 on the next clock pulse. Then on Phase G of cycle Y, AND gate 152 is enabled, thus resetting the flip-flop 146 on the next clock pulse. The circuit remains in this state until the trailing edge of the point signal, after which the next Phase F of cycle Y enables AND gate 156, thus resetting the flip-flop 148. The effect of this, then, is to generate a single pulse at the output of AND gate 166 which spans from Phase C through Phase G of cycle Y. This pulse is AND'ed with the Phase E pulse to form the Clear Firing Pulse command at the output of AND gate 168.

Compare Synchronization

Figure 4A:
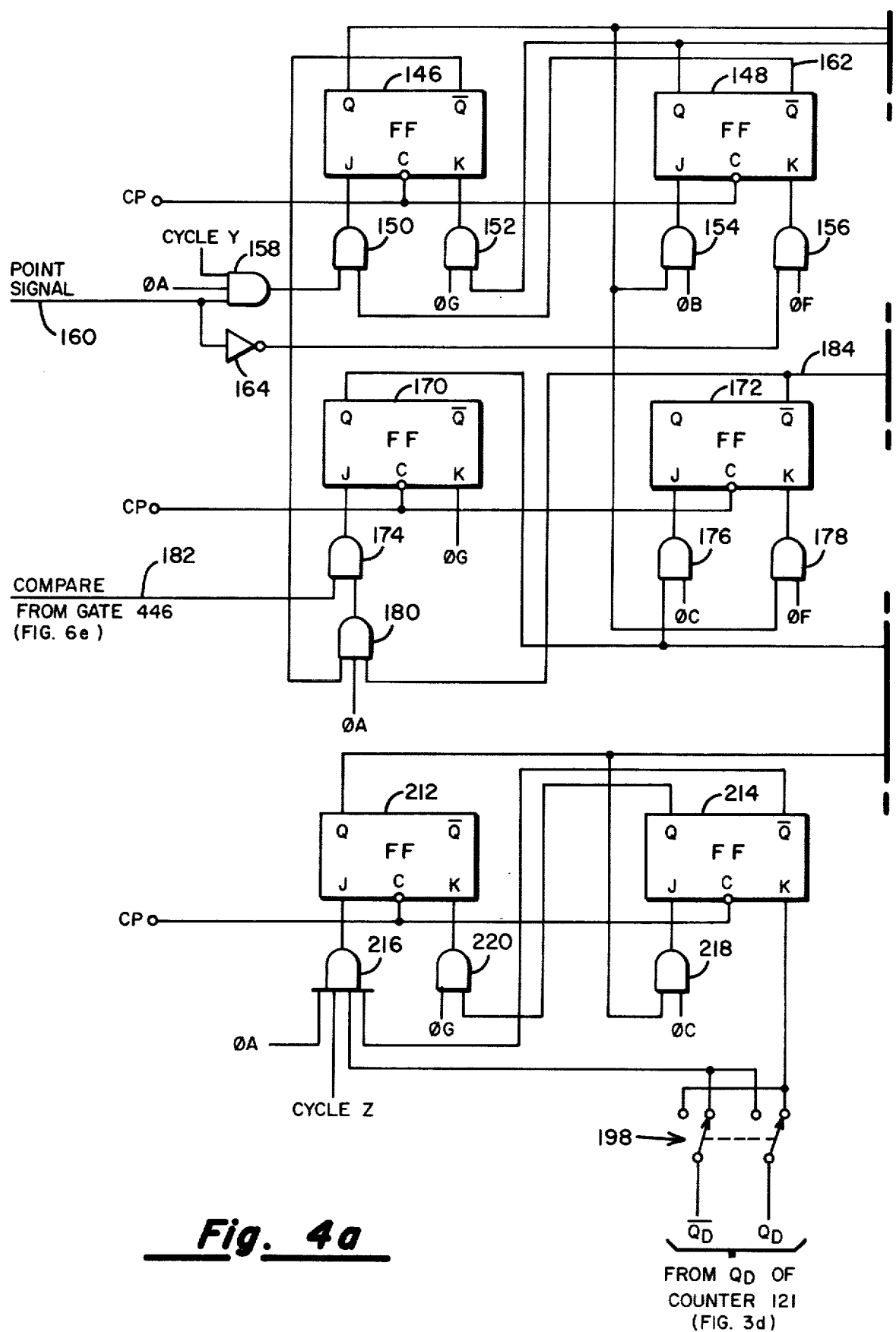

The Compare Synchronization circuits are also shown on FIG. 4a and include the intercoupled JK flip-flops 170 and 172 along with the associated AND gates 174, 176, 178 and 180. The purpose of the Compare Sync circuit is to initiate a firing pulse for each compare signal, provided there has been an intervening point signal and, failing that, to enable the point signal to initiate a firing pulse. Initially, flip-flops 146, 148, 170 and 172 are in their cleared or reset state. When the compare line 182 goes high, AND gate 174 is partially enabled and on the next Phase A timing signal, AND gate 180 is enabled, thus fully enabling AND gate 174 and causing the flip-flop 170 to be set on the next succeeding clock pulse from the output of the inverter 102 in FIG. 3a. Next, on Phase C, AND gate 176 is enabled, thus setting the flip-flop 172 which, because of the signal on line 184, inhibits AND gate 174 by way of the AND gate 180. This allows the JK flip-flop 170 to be reset on Phase G of the system timing. The resulting pulse appearing at the Q output of flip-flop 170 propagates through the inverter 186 by way of conductor 188 and AND gate 190 to clock the Firing Pulse Control Counter 192, thus initiating the firing pulse itself.

The flip-flops 170 and 172 remain in their respective states until a point signal occurs on line 160 to set the JK flip-flop 146. On the next succeeding Phase F output from the system timing circuits, AND gate 178 is enabled, thus resetting flip-flop 172. Under these conditions, AND gate 166 (FIG. 4b) is enabled, the flip-flop 172 is set, thus disabling AND gate 194. Because of this arrangement of digital logic circuits, firing pulses will only be initiated by a compare pulse on the line 182. If for some abnormal reason the compare pulse is missing, only one firing pulse will be missed. On the next succeeding point signal, flip flop 172 will have been reset, thus when AND gate 166 is enabled, AND gate 194 will also be enabled, causing the firing pulse to be initiated by the point signal via inverter 196 and NAND gate 190.

Reference Update Timing

Figure 3D:
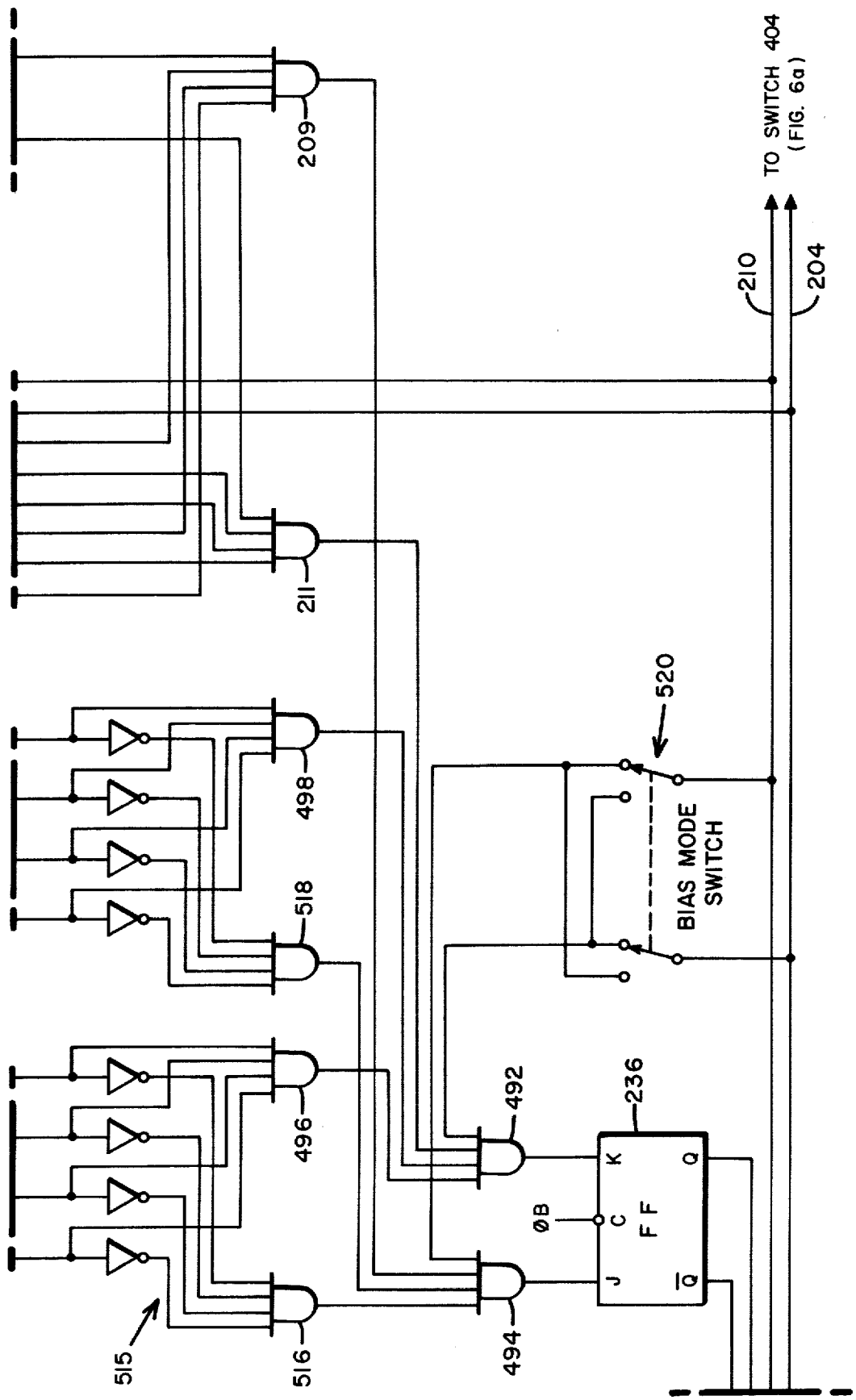

As was mentioned in conjunction with the explanation of the system block diagram of FIG. 1, the Reference Update Control circuit 10 serves to generate the timing signals necessary to update the Base Reference Counter based upon the count remaining in the Up/Down Counter 8 and further, to clear the Up/Down Counter in anticipation of the next sample interval. This timing is initiated by a transition of the most significant bit of the Dither Interval Counter 6. With reference to FIG. 3b, the most significant bit of the Dither Interval Counter comprises the $Q_D$ output of the integrated circuit counter chip 121 which is connected to the left most pole of a double pole double throw manually operable switch 198 by way of conductors 200 and 204. The compliment of this signal appears at the output of inverter 206 which is connected to the rightmost pole of the manually operable switch 198 by way of conductor 210 (FIG. 3d).

With the switch 198 in the position shown in FIG. 4a, timing will be initiated by the negative transition of stage $Q_D$ of the counter chip 121 which occurs at the end of the dither cycle. This transition occurs on the Phase A of the Y cycle. Initially, the flip-flops 212 and 214 are reset. On Phase A of the next Z cycle, AND gate 216 is enabled causing the JK flip flop 212 to be set. On the next subsequent Phase C timing signal, AND gate 218 is fully enabled, causing flip-flop 214 to be set. On Phase G, AND gate 220 is enabled, thus causing the flip-flop 212 to be reset.

The Reference Update Control circuit remains in this condition until the $Q_D$ output of counter chip 121 again sets, causing the flip-flop 214 to be reset. The resetting of the flip-flop 214 causes a single pulse to be generated at the output of flip-flop 212 which spans from Phase B through Phase G of the Z cycle. This output is used directly to form the Adder Enable command on the conductor 222. The signal is also AND'ed aned with a phase B timing control signal at gate 224 to form the Latch 1 Enable pulse on conductor 226 and AND'ed with a phase D timing signal to form the Latch 2 Enable pulse on conductor 228 which is the output from the gate 230. The output from the Q side of the JK flip-flop 212 is also AND'ed with a Phase E timing signal in gate 232 to produce the "Clear Up/Down Counter" command on the conductor 234.

If the switch 198 is set to its alternate position (alternate to the one shown), this timing is initiated halfway through the dither cycle on the positive transition of the output from stage $Q_D$ of the dither interval counter chip 121.

Up/Down Counter Control

With reference to FIG. 3d of the logic drawings, it is the JK flip-flop 236 which normally controls the up and down count intervals of the dither cycle. Just how these intervals are controlled will be described later herein below. For now, however, it is to be pointed out that when flip-flop 236 is set, NAND gate 238 is enabled via NAND gates 240 and 242. Conversely, when the flip-flop 236 is reset, the NAND gate 244 is enabled via NAND gates 246 and 248. Thus, Tach Count pulses arriving from the output of the AND gate 144 will appear on either line 250 or 252 depending upon which of the particular gates 238 or 244 is enabled.

Figure 4B:
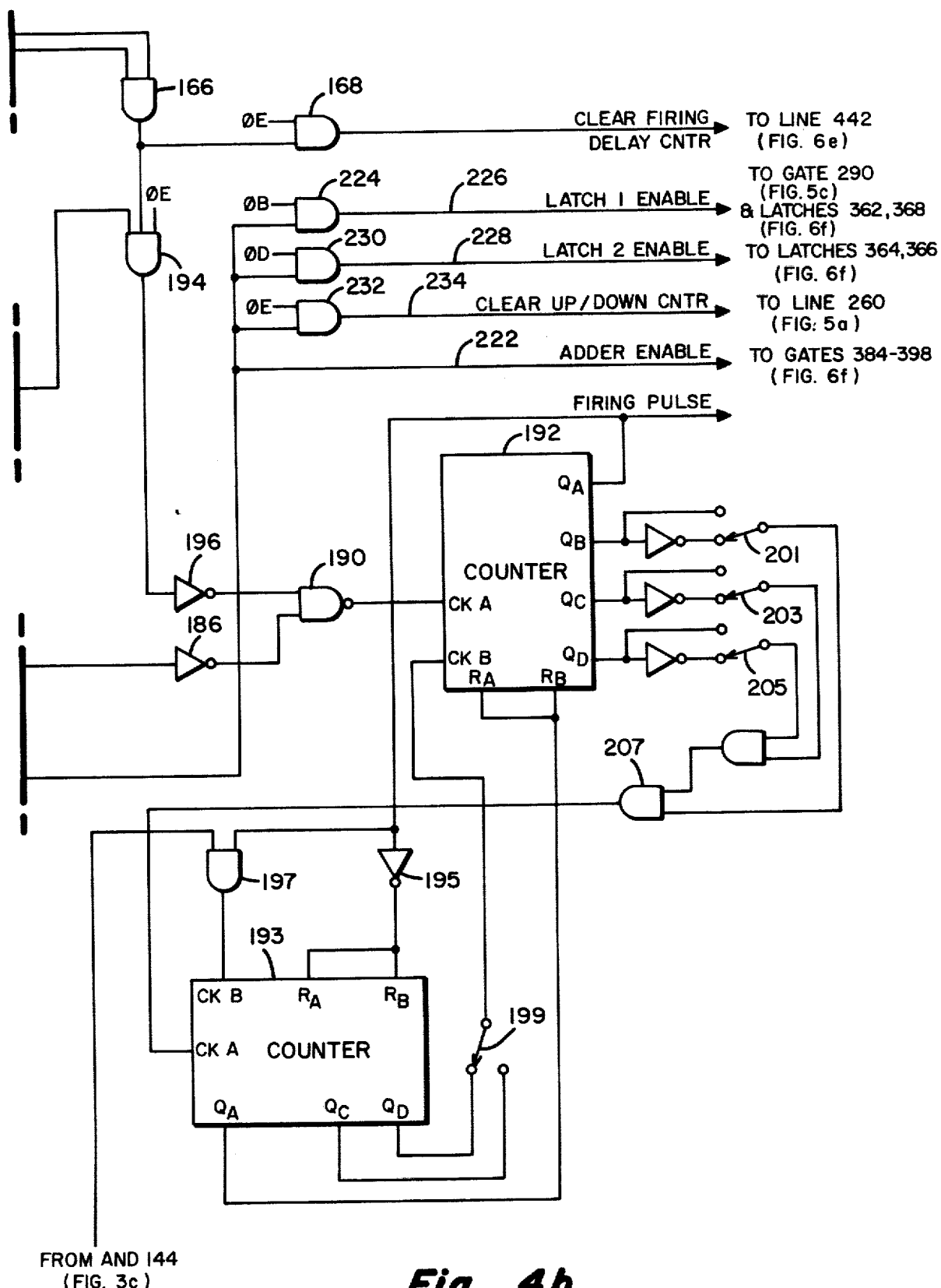
Figure 5A:
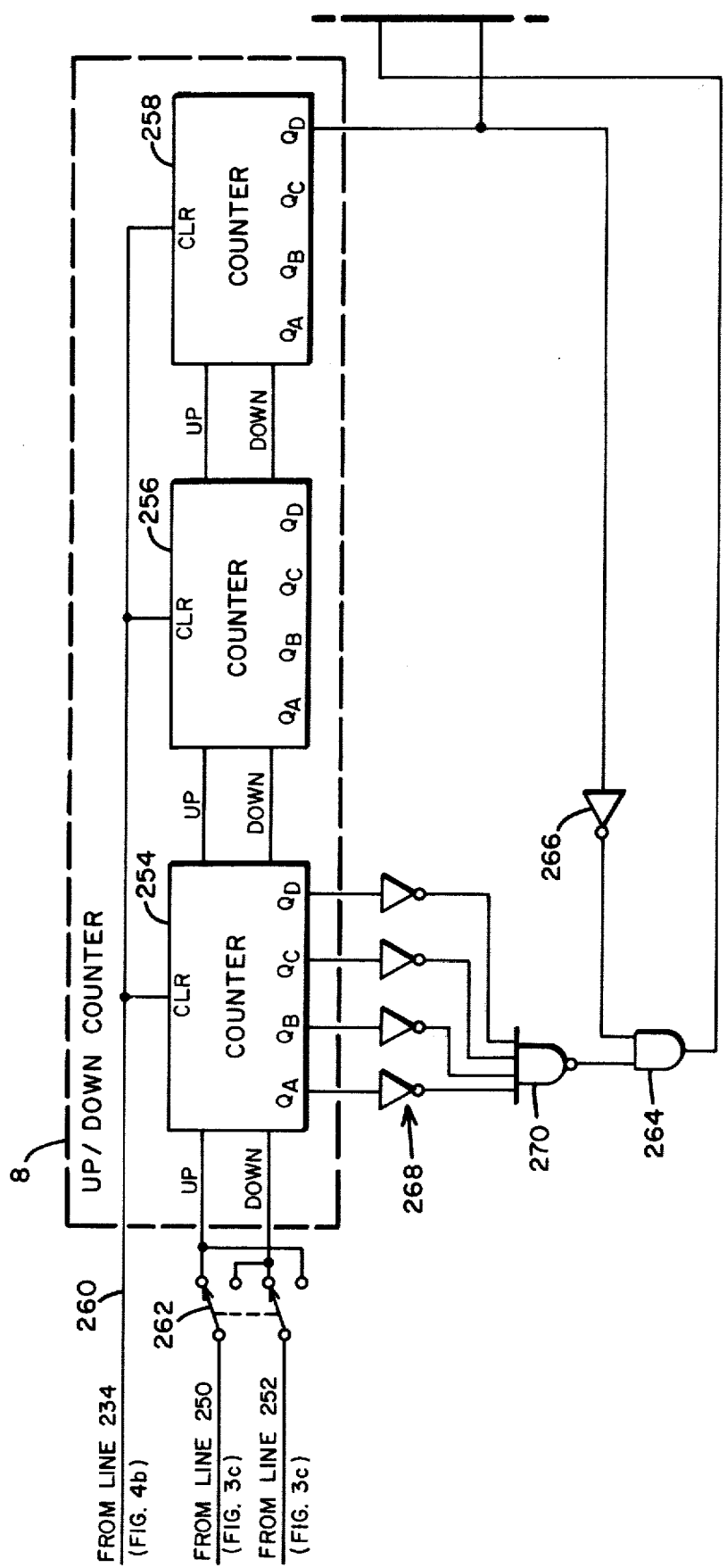

Now, with reference to FIG. 5a, the Up/Down Counter 8 is shown to comprise 3 cascaded 4 stage integrated circuit counter chips 254, 256 and 258, thus forming a 12 bit Up/Down Counter. The aforementioned "Clear Up/Down Counter" enable on line 234 of FIG. 4b is applied by way of conductor 260 to clear the Up/Down Counter 8. With the manually operable switch 262 in its position as shown, pulses from the line 250 of FIG. 3c will cause the counter to increment while pulses appearing on line 252 will cause the counter to be decremented. When the switch 262 is thrown to the position opposite to that illustrated, these functions are reversed. The Up/Down Counter 8 will advance during a portion of a dither interval and be decremented during the remaining portion of that dither interval. At the end of the dither interval, AND gate 264 will produce an output indicative of the state of the residual count. Specifically, if the count is negative, the output of state $Q_D$ of the counter chip 258 will be a binary "one", causing a "one" at the input of AND gate 290. If the count at the end of the dither cycle is 0, all outputs of the Up/Down Counter 6 will be 0 and the outputs of AND gate 264 will also be 0. The residual count is constrained to always be less than decimal 15. Hence, only the lower 4 bits of the up/down counter 6 needs to be tested to determine the existance of a positive count. Thus, as can be seen from FIG. 5a, the $Q_A$ through $Q_D$ outputs of counter chip 254 are inverted by inverters 268 and applied as inputs to NAND gate 270 whose output is coupled to the AND gate 264. For any positive count within the range of from 1, to 15, at least one of the outputs of the counter chip 254 will be a binary one signal, and thus the output of NAND gate 270 will be a one. Because under the assumed conditions the output of state $Q_D$ of the counter 258 will be a 0 which when inverted by circuit 266, causes the output of AND gate 264 to be a one.

The output of AND gate 264 constitutes a raw correction signal which is presented to the correction buffer circuits 58 and 60 of FIG. 1. A positive count will result in an incrementation of the Base Reference Counter while a negative count will result in the decrementation of the Base Reference Counter.

Correction Buffers

Due to noise in the tach signals and the quantization error introduced in the process of counting, it is common to get meaningless fluctuations of the correction signals. That is, a positive correction, followed immediately by a negative correction, followed by another positive correction, etc. Because it is undesirable to have the correction respond to noise fluctuations, the correction buffer serves a as a digital filter to suppress such fluctuation. More specifically, before a Positive Buffered Correction can be issued, there must have been at least N consecutive positive corrections without an intervening negative correction. Similarly, the negative correction buffer requires N consecutive negative corrections without an intervening positive correction. The manner in which this is accomplished will be now be described.

For positive corrections, the value of N can be selected in the range of from 0–7 by means of the manual switches 274, 276 and 278. Similarly, a value of N for negative corrections can be selected by means of the switches 280, 282 and 284.

Counters 286 and 288 each have two independent sections. Section A is a toggle flip-flop which is reset by a pulse applied to the input $R_A$ and toggled by a signal applied to the terminal labeled $CK_A$ (Clock A). The other section of the counter is arranged as a three bit counter advanced by signals applied to the $CK_B$ input and reset by a pulse applied to the terminal $R_B$. The outputs are obtained from the terminals $Q_B$ through $Q_D$. The counter 286 provides the buffer for positive correction while counter 288 provides the buffer for negative correction. Consider first the case where counter 286 is reset and counter 288 contains an arbitrary count. If a Raw Positive Correction has been sensed, the Latch 1 Enable signal from line 226 and FIG. 4b, will enable AND gate 290, which resets counter 288 via inverter 310 and AND gate 312. Because Section A of the counter 286 is reset, AND gate 300 is enabled by the output from inverter 294 such that Section B of counter 286 is clocked to a count of 1. Switches 274, 276 and 278 are illustrated in the drawings as being set to a value of three. In this case, AND gate 296 remains disabled. Thus, Section A of counter 286 remains reset and the Positive Buffered Correction line 298 remains at a "one" level. If at the time of the next Latch 1 pulse the correction is still positive, counter 286 will advance to a count of 2. A third Positive Raw Correction will advance the count to 3, thus enabling AND gate 296 which set Section A of counter 286 and issues a Positive Buffered Correction signal on the line 298. AND gate 300 is now disabled, thus freezing the counter 286 in its present state, maintaining a continuous Positive Buffered Correction signal until a Negative Raw Correction pulse is detected.

This event enables AND gate 302 and the Latch 1 enable signal propagates through inverter 306 and AND gate 304 to reset both sections of the counter 286. Since AND gate 292 is now enabled, counter 288 begins to count in the same manner previously described. If the required number of Negative Raw Corrections occur without an intervening Positive Raw Correction as required by the settings of the switches 280, 282 and 284, AND gate 308 will be enabled, setting Section A of counter 288 and thereby issuing a Negative Buffered Corrections signal on line 299.

Manual Step Correction

Figure 5B:
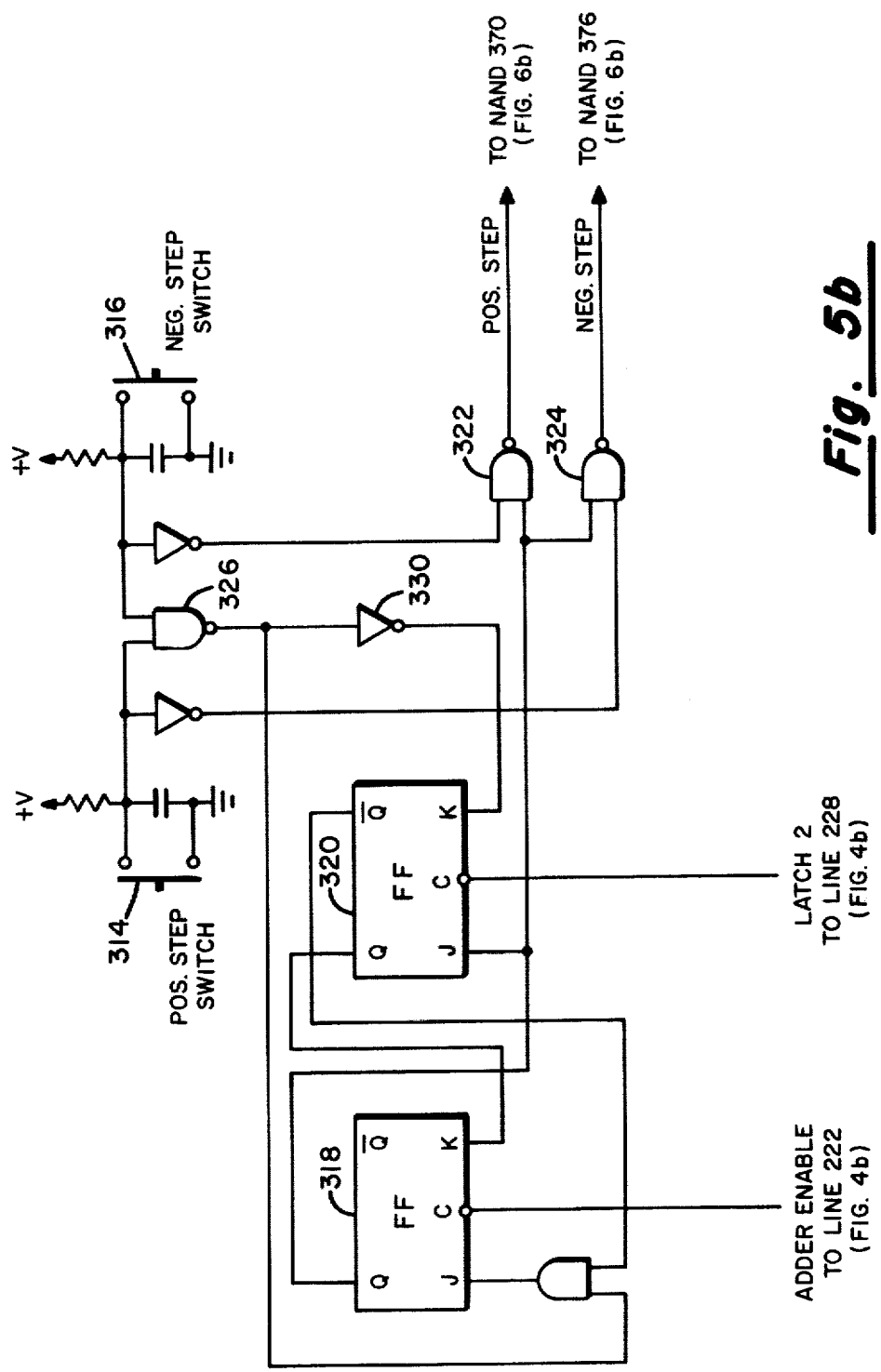
Figure 5C:
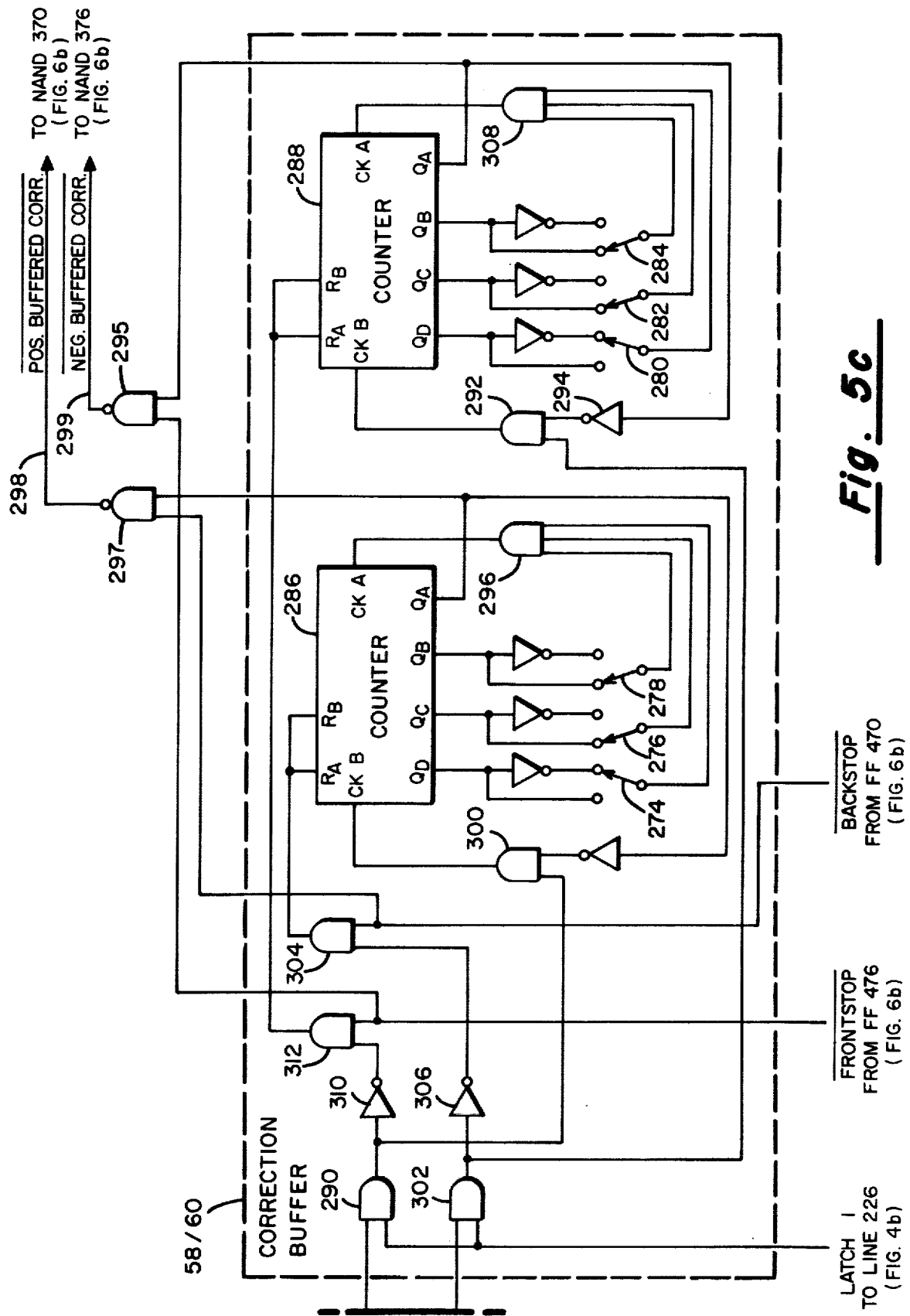

With reference to FIG. 5b, push button switches 314 and 316 provide a means to apply manually incremental corrections to the reference count. Each closure of the Positive Step Switch 314 will cause an increment of the reference count, while each closure of the Negative Step Switch 316 will cause a decrement of the reference count. Initially, flip-flops 318 and 320 are reset and thus NAND gates 322 and 324 are disabled. If either switch 314 or 316 is closed, the output of NAND gate 326 goes high, thus enabling AND gate 328 and presenting a "one" input to the J input terminal of the JK flip-flop 318. On the next Adder Enable pulse appearing on line 222 in FIG. 4b, flip-flop 318 sets, enabling either NAND gate 322 or 324, depending upon which of the switches 314 or 316 has been closed. Since the J input of the flip-flop 320 is now high, the leading edge of the Latch 2 pulse appearing on line 228 will set the flip-flop 320, thus presenting a "one" signal to the K input of the flip-flop 318 and disabling AND gate 328. Then, on the next Adder Enable command, the flip-flop 318 resets, thereby enabling AND gates 322 and 324. The circuit remains in this state until the switch again opens, causing the output of the inverter 330 to go high which allows the flip-flop 320 to reset on the next Latch 2 enable pulse. Thus, it can be seen that each Positive Step Switch closure results in a single synchronized negative pulse emanating from the gates 322, ($\overline{\text{Positive Step}}$) while each Negative Step Switch closure results in a similar pulse at the output of NAND gate 324, ($\overline{\text{Negative Step}}$).

Adder Array

Figure 6:
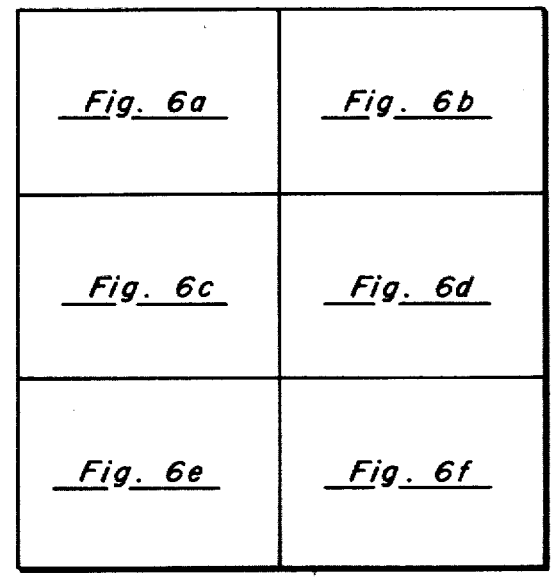
FIGS. 6a through 6f, when arranged as shown in FIG. 6, comprise a logic diagram of the Dither Control, the Adders, the Fire Time Control, and the Frontstop and Backstop Control circuits of the block diagram of FIG. 1.
Figure 6C:
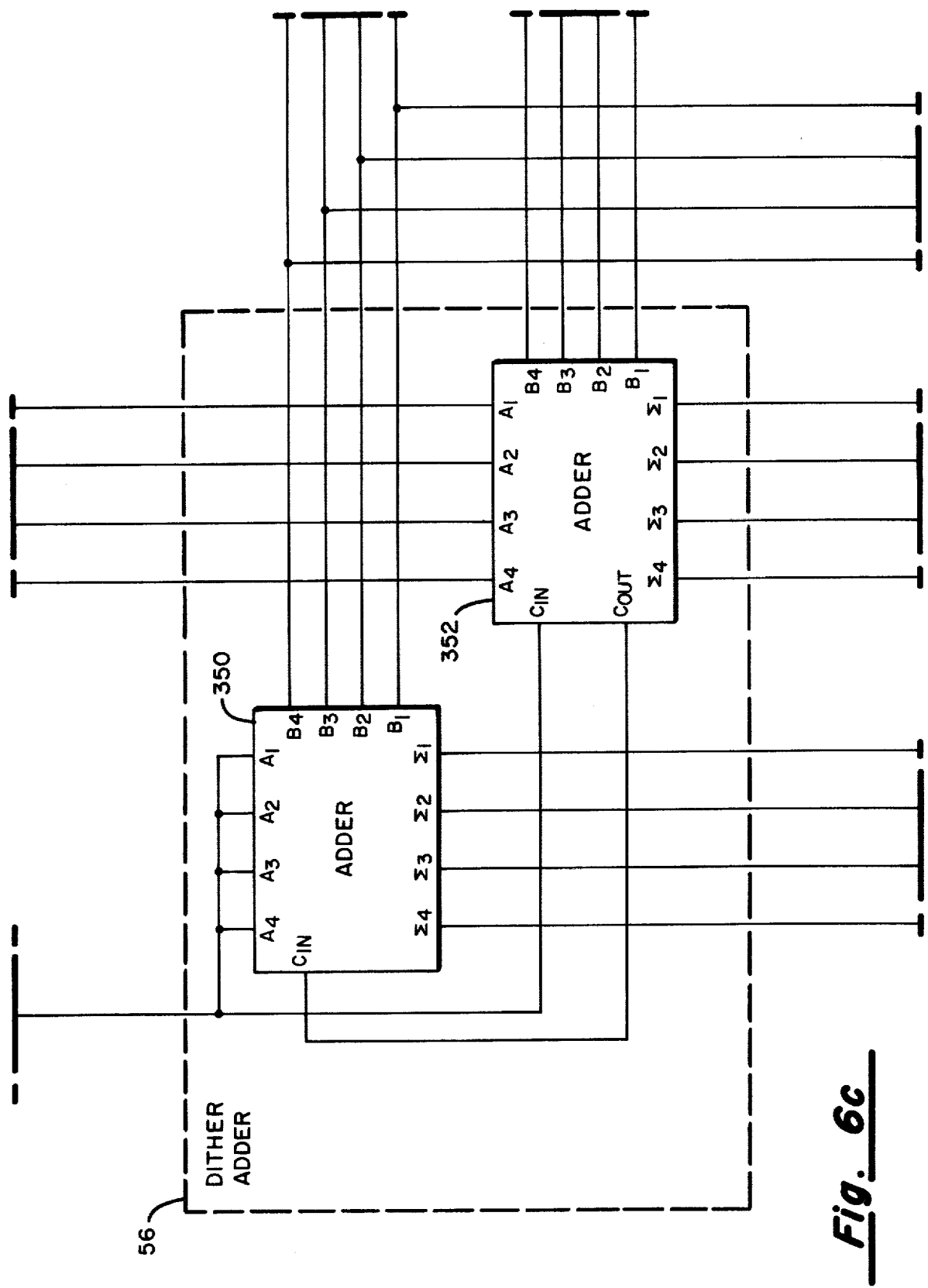
Figure 6D:
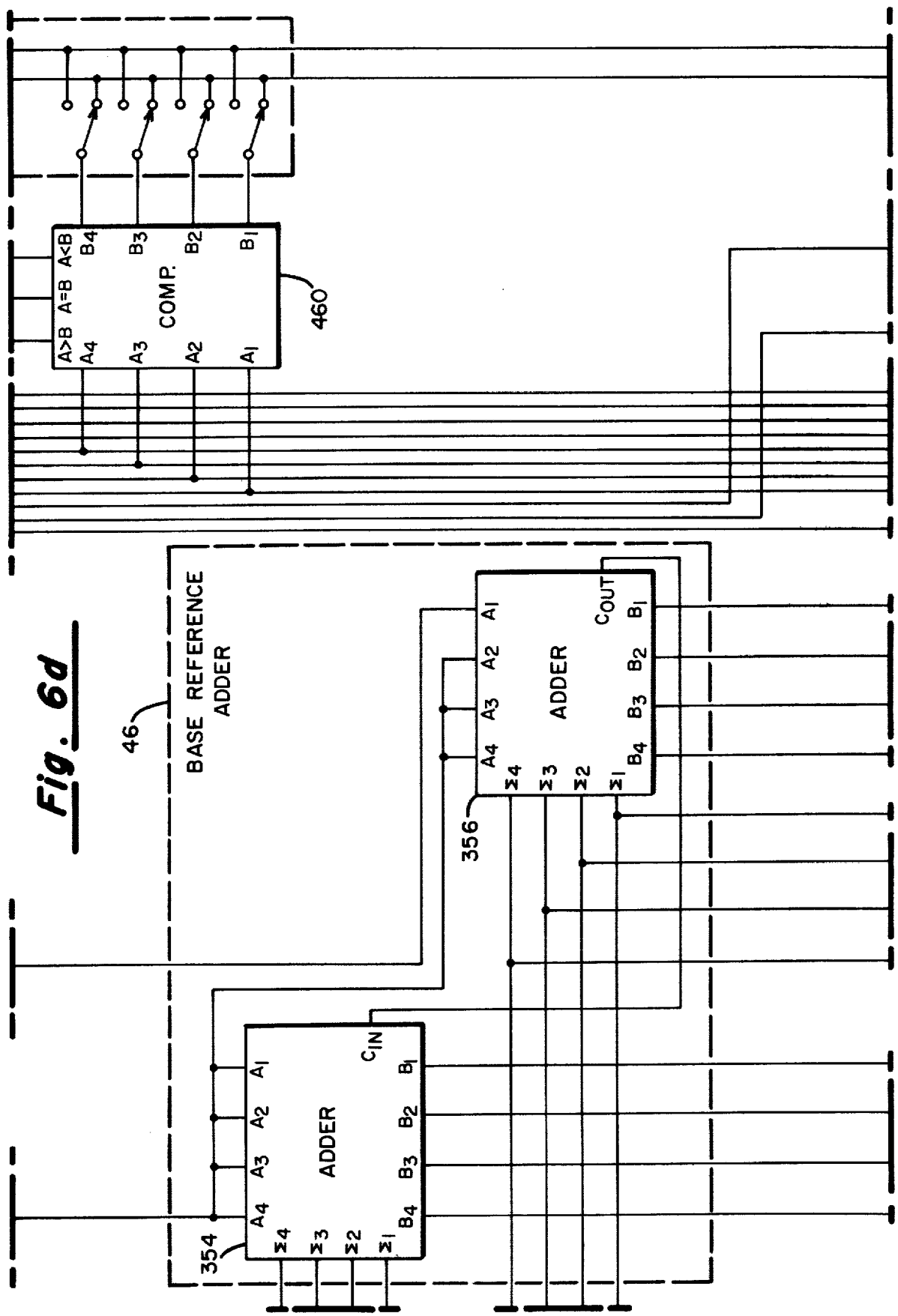
Figure 6E:
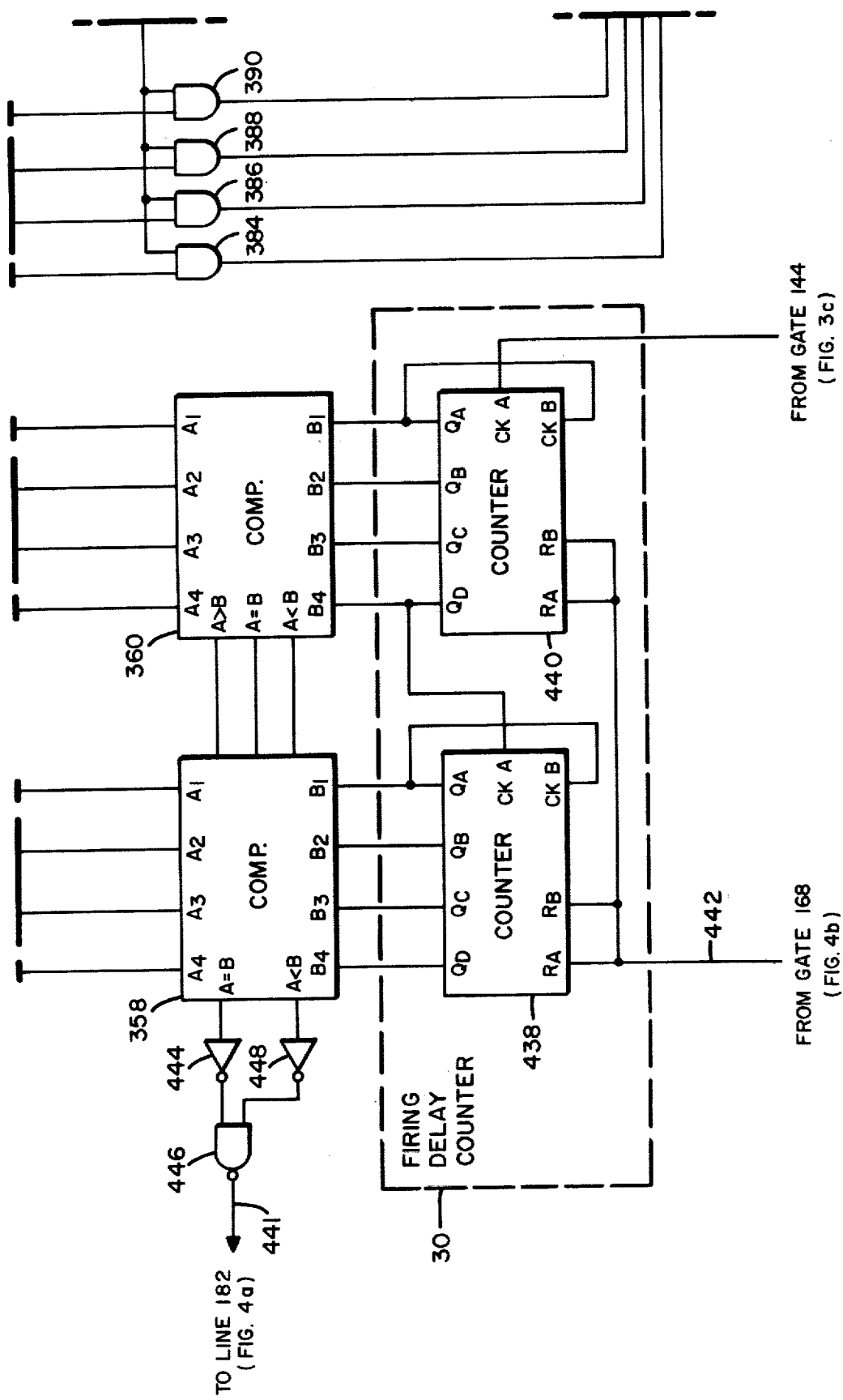
Figure 6F:
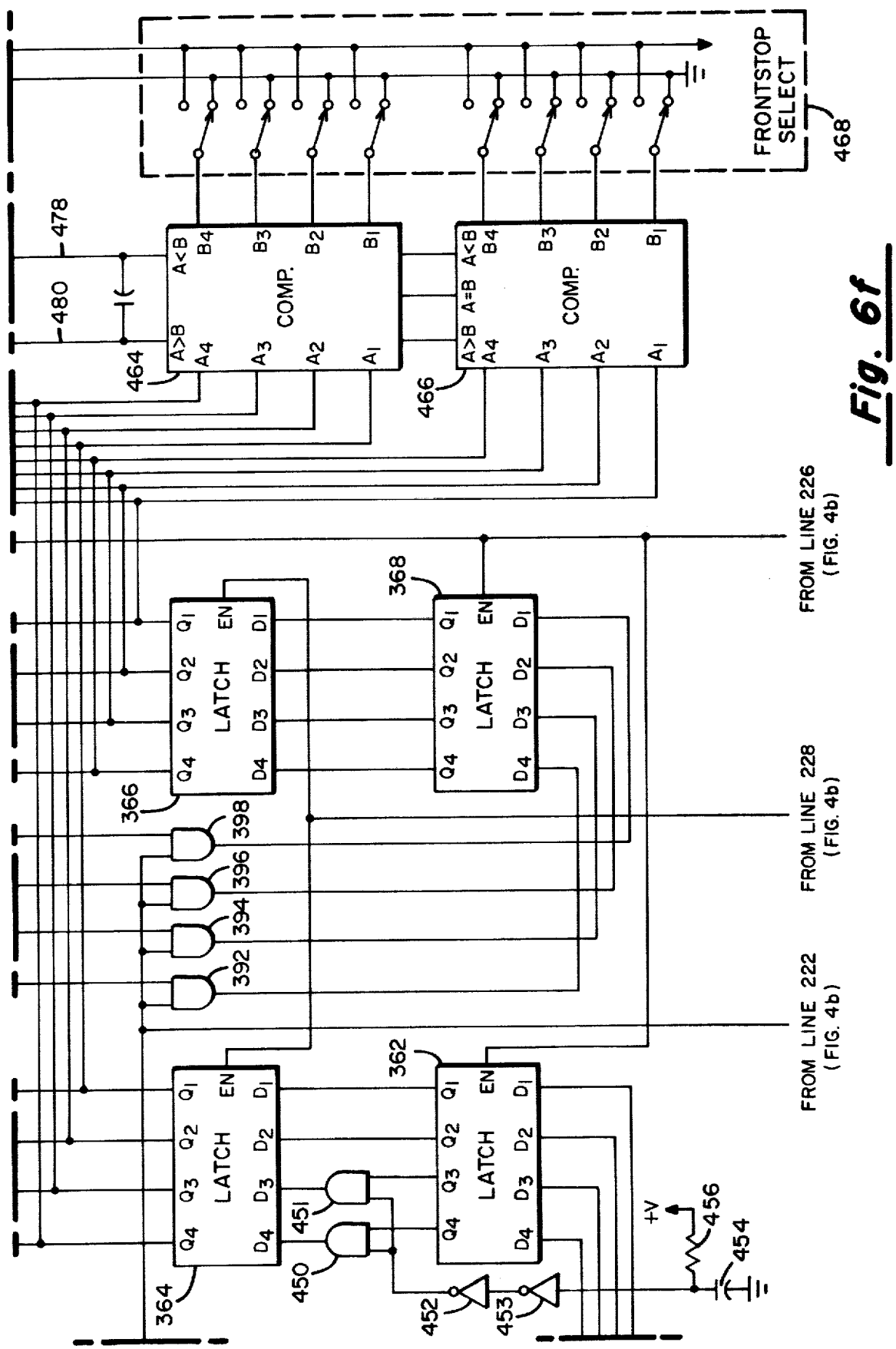

Referring next to the logic drawings of FIGS. 6a through 6c, the integrated circuit chips identified by numerals 350, 352, 354 and 356 are four bit adders whose output $\Sigma_N$ is the sum of the respective inputs $A_N$ and $B_N$. The circuits 358 and 360 comprise integrated circuit comparitors in which the output terms $A=B$, $A<B$, and $A>B$ are determined by the relative values of the $A_N$ and $B_N$ input thereto. The integrated circuits identified by numerals 362, 364, 366 and 368 are each four-bit latches which sense the status of inputs $D_{1-4}$ during an enable signal and which are then latched on the trailing edge of the enable signal.

Adders 354 and 356 are cascaded to form a signal eight-bit adder. The outputs of the combined adders represent the base reference count which remains stable throughout an entire dither interval. On the final Z cycle of the dither interval, this reference count is altered, depending upon the condition of the correction signal. Correction signals can be generated either by automatic buffered corrections or manual step corrections in the manner previous explained. Also, as will be explained later hereinbelow, the corrections signals can be generated also by Frontstop or Backstop signals.

With continued reference to FIG. 6b, it can be seen that any positive correction signal will cause the output of NAND gate 370 to go high. This causes the NAND gate 372 to go low and the output of NAND gate 374 to go high, presenting a count of 00000001 to the "A" inputs of Base Reference Adder comprised of the integrated circuits 354 and 356. Any negative correction will cause the output of NAND gate 376 to go high and the output of NAND gate 378 to go low. Thus, the output of inverter 380 goes high as does the output of NAND gate 374. This presents a count of 11111110 to the A input of the Base Reference Counter. With the Carry-In input of the adder 356 grounded, this corresponds to a value of minus one ($-1$).

If there happens to be a simultaneous positive and negative correction, both NAND gates 370 and 376 will output high signals, thus enabling NAND gate 382 which serves to disable NAND gates 372 and 378, resulting in a low output from both inverter 380 and NAND gate 374. This causes an input of all 0's to the A inputs of the Base Reference Adder 46. The same results occur if there are no corrections since NAND gates 372 and 378 are also disabled for this condition.

Consider initially the case where the correction value is zero. Under this condition, the Base Reference Adder outputs are then identical to the counts stored in the Base Reference Register which is comprised of the latches 364 and 366. The leading edge of the Adder Enable pulse appearing on line 222 in FIG. 4b enables the AND gates 384 through 398 thus presenting the Base Reference Adder output to the inputs of the 8-bit latch comprised of latches 362 and 368. The trailing edge of the Latch 1 Enable pulse stores this count in the latch and thus presents it to the input of the Base Reference Register. The trailing edge of the Latch 2 Enable pulse stores the count in this register, the outputs of which are presented to the B inputs of the Base Reference Adder 46, comprised of the integrated circuit chips 354 and 356.

It is to be noted that this foregoing type of double buffering between the latch and the Base Reference Register is required in that the state of the B inputs of the adders immediately affect the state of the adder outputs. Since the A inputs to the adder are 0, the output sum is equal to the value at the B inputs, and for this condition, the Base Reference Count remains unchanged. If a positive correction occurs, the adder output will be the value of the Base Reference Count $+1$. The value is stored in the latches 364 and 366 comprising the Base Reference Register on the occurrence of the Latch 2 Enable pulse. The resulting adder output, then, will be the previous reference count $+2$, since the Base Reference Count has been incremented and the A input to the adder is still a plus one ($+1$). If on the next correction cycle the correction is 0, the adder outputs will equal the current Base Reference Count. In a similar manner, a negative correction signal causes the Base Reference Count to be decremented.

The adders 350 and 352 are cascaded to form an 8-bit Dither Adder 56 of the block diagram of FIG. 1. It is the dither adder which sums the output of the Base Reference Adder with the output of the Dither Amplitude circuit. The manner in which this is accomplished will next be explained.

The lines 400 and 402 control the sign of the dither. These lines are connected by way of a manually operable switch 404, termed the Dither Phase Invert Switch, to the most significant bit of the Dither Interval Counter 6 of FIG. 3b. This arrangement allows the relationship between the sign of the dither and the phase of the dither interval to be inverted. The switches 406 through 412 constitute the Dither Amplitude Switches 52 of the block diagram of FIG. 1. The switches 406 through 412 when in their positions as illustrated in FIG. 6a, define a dither amplitude count of 0. The response of the dither circuit for this condition will now be explained. At the time that the line 400 received a high signal, NAND gate 414 through 420 will remain disabled since their other inputs are all connected to ground through the Dither Amplitude Switches 406 through 412. At this time, NAND gates 422 through 428 will also be disabled because line 402 is low. Thus, NAND gates 430 through 436 will all be fully enabled, thus developing a count of 0000 at the Dither Amplitude circuit output which is presented to the lower A-inputs of the Dither Adder. Since line 400 is low, the upper A-inputs of the Dither Adder will also be 0000. Now, when the most significant bit of the Dither Interval Counter changes, the signal on line 400 goes low while that on line 402 goes high. This serves to enable NAND gate 422 through 428 in that their other inputs are connected to a voltage +V via the Dither Amplitude Switches 406 through 412. This disables NAND gates 430 through 436, thus generating a 1111 count at the Dither Amplitude circuit's output.

The line 400 also bears a carry-in signal for the adder 352 and also forces a count of 1111 into the upper A-inputs of the Dither Adder. The Dither Adder outputs form the eight-bit count which represents the dithered reference count. This is the sum of the Base Reference Count presented to the B-input of the Dither Adder and the Dither Count presented to the A-inputs thereof.

In the sequence previously described, one phase of the dither cycle presents a count of all zero's to the Dither Adder, thus the adder outputs will be identical to the Base Reference Count. In the alternate portion of the dither cycle, a count of all one's, along with a Carry-In signal is presented to the dither adder. This constitutes a negative zero and, thus, the Base Reference Count is made to appear at the output of the Dither Adder.

If the positions of the switches 406 through 412 are altered, the outputs occurring at the corresponding gates 430 through 436 will be complimented. For example, if switch 408 is changed from the position shown, the first dither phase will produce a count of 00000100 which will add a count of 4 to the Base Reference Count. On the alternate dither cycle, the Dither Amplitude count will be 11111011 or, in other words, the compliment of the previous count. Since adding the compliment of number with a Carry-In signal is equivalent to subtraction, the resulting output will be the Base Reference Count $-4$. In this manner, the Dither Amplitude Switches can be set to promote a dither around a Base Reference Value of up to 15 counts.

The integrated circuit counter chips 438 and 440 comprise the firing delay counter 30 of the block diagram of FIG. 1. This counter is reset by a Clear Firing Delay command generated at the output of AND gate 168 in FIG. 4b each time a point pulse is sensed. The firing delay counter is incremented by the tach count pulses appearing at the output of AND gate 144 in FIG. 3c each time a tachometer pulse is sensed. Comparators 358 and 360 are cascaded to form an eight-bit comparator which compares the different dithered counts presented to the A-inputs to the firing delay count presented to its B inputs. If this count reaches a value equal to the Dithered Reference Count, the output A=B of the comparator 358 will cause the compare line 442 to go high via inverter 444 and NAND gate 446. As the firing delay counter 438-440 continues to increment and the B inputs become greater than the A inputs from the Dither Adder, compare line 441 is maintained at a high level via inverter 448 and the NAND gate 446. As was previously described, this signal is used to initiate the firing sequence. The effect of this is to provide a timing relationship in which the interval between a point signal and the resulting firing signal is defined by a specific number of tach pulses where this number is determined by the value of the Dithered Reference Count. Upon initial power-up, it is desirable that the Optimizer device be initialized to a reference count which is within an operable range for it. This is accomplished by the NAND gates 450 and 451 which are disposed between the Latches 362 and 364 along with the NAND gates 452 and 453 which provide the enabling controls for the gates 450 and 451. Initially, the capacitor 454 is discharged, disabling AND gates 450 and 451 and forcing a minimum reference count of 11000000 into the Latch. As the capacitor 454 charges through the resistor 456, the output of the gate 452 goes high and the output of AND gates 450 and 451 will reflect the data input directly in unmodified form.

Backstop and Frontstop Limits

Integrated circuits 458 and 460 are separate comparator circuits which are cascaded to form an eight-bit comparator which functions to compare the value of the Base Reference Count applied to the A inputs to the value of the Backstop Count applied to the B inputs, the latter being established by the manually operable switches shown enclosed by dash line box 462. Thus, the switches 462 correspond to the Backstop Select circuit 62 in the block diagram of FIG. 1.

In a similar fashion, the integrated circuits 464 and 466 are cascaded into an eight-bit comparator for comparing the Base Reference Count to the Frontstop value determined by the setting of the manually operable switches shown enclosed enclosed by the dash line box 468. These switches, then, correspond to the Frontstop Select 66 in the block diagram of FIG. 1.

The purpose of the circuits thus far described is to constrain the Base Reference Count so as to be less than a maximum limit established by the backstop setting and more than a minimum limit determined by the Frontstop Switch settings. The outputs of the Backstop Comparator 458 are presented to the J and K inputs of a flip-flop 470 by way of the conductors 472 and 474. If the Base Reference Count exceeds the Backstop Count, the flip-flop 470 will be cleared, thus generating the signal $\overline{\text{Backstop}}$ on line 473 which thereby disables the NAND gates 376 and 297, forcing a positive correction. Once the reference count has been decremented below the Backstop Count, the A<B output of the comparator 458 will cause the flip-flop 470 to reset and permit normal operation. In a like fashion, the output the comparator 464 is applied to a flip-flop 476 by way of conductors 478 and 480 to control the state of the flip-flop 476 and generate a $\overline{\text{Frontstop}}$ signal on the conductor 482 whenever the Base Reference Count presented to the comparator is less than the Frontstop count established by the setting of the switches 468. This causes the NAND gates 370 and 295 to be disabled, thereby forcing a negative correction.

Dither Interval Decoder

The purpose of the Dither Interval Decoder circuit is to divide the dither cycle into two phases, one phase during which tach pulses result in up-counts being presented to the Up/Down Counter 8 of FIG. 5a, and the alternate phase in which tach pulses result in down counts being presented to this counter. Although the preferred mode is to operate with a quarter dither cycle offset and with symmetrical bias, it is most easily understood by considering the operation with no bias and without offset. To establish this condition, the double-pole, double-throw switch 484 of FIG. 3c is set to the position opposite from that which is illustrated. Thus, the NAND gates 486 and 488 are partially enabled. For the first half of the dither interval, i.e., counts 0 to 8191, the output from stage $Q_D$ of counter chip 121 will be 0 and the output from inverter 206 is a one. As such, NAND gate 486 is enabled which, in turn, enabled NAND gate 244 by way of NAND gate 248. This allows the Tach Count pulses from NAND gate 144 to propagate to the count-up input of the Up/Down counter input via the switch 262 in FIG. 5a. For the remaining half of the dither interval, i.e., counts 8192 to 16,383, however, the output from stage $Q_D$ of counter chip 121 is a binary "one" and the output of the inverter 206 is zero. Under this condition, NAND gate 488 is enabled which, in turn, enables NAND gate 238 by way of NAND gate 242. This action allows the Tach Count pulses to propagate to the count-down input of the Up/Down Counter 8 of FIG. 5a by way of the switch 262. It can be seen then, that for this case, the up-count period is in phase with the advance period and the down-count period is in phase with the retard period. The double-pole, double-throw switch 490 allows an inversion of this process, such that counting down may be made to occur during the advance period and counting up accomplished during the retard period. The effect of this is to interchange the sense of the correction signals appearing at AND gate 264 in FIG. 5a.

Next to be considered is the case where this phase relationship is altered one-quarter of a dither cycle. For this case, the switch 484 on FIG. 3c, is in the position as illustrated and, as such, NAND gates 486 and 488 are disabled whereas gates 240 and 246 are partially enabled. When in this condition, the count mode is controlled by the state of the flip-flop 236. When this flip-flop is set, NAND gate 244 is enabled by way of gates 248 and 246 while when it is reset, NAND gate 238 is enabled by way of gates 242 and 240. With switch 262 in the position shown, the count-up mode will be selected when flip-flop 236 is set and the count-down mode will be selected when flip-flop 236 is reset. The JK flip-flop 236 is clocked on each Phase B timing pulse and will set whenever AND gate 492 outputs a one signal and it will be reset when AND gate 494 outputs a one.

By examining the inputs to these last mentioned AND gates, it can be seen that the conditions which will set the flip-flop 236 are that AND gates 496, 498 and the output of stage $Q_D$ of counter chip 121 be simultaneously in the "one" state. The single-pole, double-throw switches 500 through 514 correspond to the Bias Select function represented by block 26 in the general block diagram of FIG. 1. When thrown to the position as shown in FIG. 3b, the system is operating with zero bias. For this case, the output of AND gate 496 will be a "one" when all outputs of the counter chip 118 are "0". Likewise, the output from AND gate 498 will be a one when all outputs from the counter chip 119 are "0". The output of AND gate 209 will be a "1" when the outputs from stages $Q_A$, $Q_D$ and $Q_C$ of counter chip 121 are 0,0 and 1, respectively, and also that the outputs of stages $Q_B$ and $Q_C$ of counter chip 123 are also 0. Thus, the aggregate of these conditions required to set flip-flop 236 correspond to a binary count of 01000000000000 which is equivalent to 4096. In this manner, the beginning of the up-count phase is delayed one-quarter cycle from the beginning of the advance phase. Similarly, the output of AND gate 494 will be a one when the output from AND gates 516, 518 and 211 and the output from stage $Q_D$ of counter chip 121 are all simultaneously ones. Since the condition for which this occurs is the exact compliment of the previously described conditions, it corresponds to a count of 10111111111111 or 12287. This results in a symmetrical up/down counting mode in which both the up period and the down period equal 8192 counts or one-half of the dither interval. Because the Optimizer system makes corrections to adjust the timing such that the total number of up counts equals the total number of down counts, this case implies an operating point where the average speed of the engine for the advance part of the cycle is equal to the average speed for the retard part of the cycle. This condition corresponds to an operating point at MBT.

As was mentioned in the introductory portion of this specification, it may not always be most desirable to operate at this point, but rather to move the operating point slightly in retard of MBT, the concept of biasing is introduced into the system. That is to say, a bias in favor of the retard direction is accomplished by altering the symmetry of the up and down count intervals. If the down-count interval is shortened and the up-count interval is lenghtened, the Optimizer device will seek and operating point in which the down-count rate is slightly higher than the up-count rate. This implies that the engine speeds up slightly during the dither advance phase and slows down slightly during the dither retard phase, which corresponds to operation in retard of MBT. Bias is introduced by means of the switches 500 through 514 which form an eight-bit input register with switch 500 representing the least significant bit and switch 514 representing the most significant bit. Thus, an entry of a bias value of up to 225 counts is provided for.

For the purpose of illustration, consider the application of 50 counts of bias. This corresponds to a binary value of 00110010. This count is entered by altering the position of switches 502, 508 and 510 from the position illustrated in the drawings. When this is done, the flip-flop 236 will be set for a binary count of 01000000110010, which corresponds to the decimal number 4146 and will reset for a count of 10111111001101 which corresponds to the decimal number 12,237. In this manner, then, the up-count period has been shortened by 100 counts and the down-count period has been increased by 100 counts.

In a similar manner, operation in advance of MBT can be achieved by applying advance bias. This bias alters the symmetry of the up/down count in the opposite sense, i.e., the down-count interval is increased and the up-count interval is decreased. Operation in this mode is achieved by setting the switch 520 (termed the Bias Mode Switch) to the position opposite from that shown in the drawing of FIG. 3d. This manipulation of the switch inverts the sense of the most significant bit of the Dither Interval Counter at the inputs of the AND gates 492 and 494. As such, flip-flop 236 will now set for a binary count of 11000000000000 which corresponds to a decimal count of 12,288. The flip-flop will reset on a binary count of 00111111111111 which corresponds to a decimal count of 4095. If bias is now entered, the set count will be increased by the amount of bias and the reset count will be decreased by the amount of bias. This, then, accomplishes the desired asymmetry, however, now, the sense of the flip-flop 236 has been inverted, i.e., it sets at the end of the third quarter of the dither cycle and resets at the end of the first quarter. This effect can be negated by changing the position of the switch 262 in FIG. 5a which interchanges up and down counts, respectively.

Firing Pulse Width Control

Counter circuits 192 and 193 each contain two sections; the A-section, which is a single toggle flip-flop controlled by $CK_A$ and with an output $Q_A$ and the B-section, which is a three-counter controlled by $CK_B$ and having outputs $Q_B$, $Q_C$ and $Q_D$. Signal inputs $R_A$ and $R_B$ reset sections A and B, respectively. As has been previously described, a firing pulse is initiated by the occurrance of a binary "zero" signal at the output of either of inverters 196 or 186 in FIG. 4b. When this occurs, the output of NAND gate 190 goes high, toggling the A-section of the counter 192 to the set state. This output provides the firing pulse signal and additionally releases the reset of both sections of counter 193 by way of inverter 195 and also enables AND gate 197 so that tach pulses can propagate to the $CK_B$ input of the counter 193. With the Firing Ratio Switch 199 in the position as shown, the tach pulses are effectively divided by eight and applied to the $CK_B$ terminal of counter 192. Switches 201, 203 and 205 provide a selectable decode of the B-section of counter 192 similar to that described in the foregoing section of this specification dealing with the buffer circuits. When the count in the B-section of counter 192 matches the count set on the switches 201 through 205, AND gate 207 is enabled which sets the A-section of the counter 193 and this output, in turn, resets both sections of counter 192, which then causes a reset of both sections of counter 193, terminating the firing pulse. In this manner, the firing pulse width can be selected to correspond to a desired specific number of tach pulses. The number, itself, is determined by the count entered via the switches 201, 203 and 205 times the weighting of the Firing Ratio Switch 199. With the switch in the position as shown, this weighting is 8, which for the opposite position, the weighting is 4.

With no limitation intended, and merely for the purpose of fully setting forth the "best mode" contemplated for carrying out the invention, the following table sets forth component descriptions whereby the system may be implemented.

| ITEM | TYPE |
|---|---|
| OSC. 100 | MC 4024 |
| Counters 104, 114, 118, 119 121, 123, 192, 193, 254, 256, 258, 286, 2881 | 74193 |
| Decoder 106 | 74155 |
| Flip-flops 134, 136, 236, 146, 148, 170, 172, 212, 214, 318, 320, 470, 476 | 7476 |
| Adders 350, 352, 354, 356 | 7483 |
| Comparators 358, 360, 458, 460, 464, 466 | 7485 |
| Counters 438, 440 | 7493 |
| Latches 362, 364, 366, 368 | 7475 |

While there has been shown and described a preferred embodiment of the invention and the best mode contemplated for practicing same, it is to be understood that modifications of the invention will become apparent to one skilled in the art from a reading of the instant disclosure. For example, other types of circuits may be used and the logic may be rearranged or replaced with substantially equivalent arrangements. Accordingly, the scope of the invention should be determined from the following claims.

I claim:

1. In an optimizing control system for use with an energy consuming machine of the type having means for cyclicly perturbating a machine control parameter with respect to an initial reference setting, means for measuring a change in the machine's output performance occasioned by said perturbation of said machine control parameter, and means for changing said control parameter from said initial reference setting in discrete steps in a direction dependent upon the output of said measuring means such that the changed reference setting is made to approach an optimum operating point, the improvement comprising:

(a) first circuit means for establishing an upper limit value for said reference setting on one side of said optimum operating point said first circuit means comprising:
   1. a set of switches connected to a source of reference potential such that a first or a second binary signal level can be selectively applied to the pole of the individual switches in the set, the binary signals appearing collectively at the poles of said set of switches defining a binary word representative of a predetermined limit,
   2. comparator means having first and second pluralities of input terminals and at least one output terminal,
   3. means coupling said poles of said set of switches to said first plurality of comparator input terminals, and
   4. means coupling a binary word representative of said changed reference setting to said second plurality of comparator input terminals, (b) second circuit means for establishing a lower limit value for said reference setting on the other side of said optimum operating point comprising:
   1. a further set of switches connected to a source of reference potential such that a first or a second binary signal level can be selectively applied to the pole of the individual switches in said further set, the binary signals appearing collectively at the poles of said further set of switches defining a binary word representative of a predetermined limit,
   2. further comparator means having first and second pluralities of input terminals and at least one output terminal,
   3. means coupling said poles of said further set of switches to said first plurality of input terminals of said further comparator means, and
   4. means coupling a binary word representative of said changed reference setting to said second plurality of input terminals of said further comparator, (c) further means responsive to said first and second circuit means for inhibiting said means for changing said control parameter such that said reference setting is constrained to lie between said upper and lower limit values.

2. In an optimizing control system for use with an energy consuming machine of the type having means for cyclicly perturbating a machine control parameter in opposite directions about an initial reference setting, means coupled to the machine's output shaft for generating tach pulses at a rate proportional to the machine's output shaft speed, means for accumulating said tach pulses during first and second predetermined intervals of the period of said cyclic perturbation, digital logic means for comparing the number of said tach pulses accumulated during said first and second predetermined intervals, correction circuit means responsive to the output of said logic means for generating correction control signals, and control parameter changing means coupled to receive said correction control signals for changing said reference setting from said initial value in a direction tending to increase the number of said tach pulses generated during one of said first and second predetermined intervals, the improvement comprising:
- (a) programmable means for establishing first and second digital values corresponding to predetermined upper and lower limits for said reference setting, respectively;
- (b) digital comparator means coupled to said programmable means and adapted to receive digital signals representing a current reference setting for producing an out-of-bounds signal when said reference setting is outside of a range defined by said first and second digital value; and
- (c) further means responsive to said out-of-bounds signal and coupled to said correction circuit means for changing said reference setting such that said reference setting is returned to said range defined by said first and second digital values.

3. Apparatus as in claim 2 and further including manually operable means coupled to said correction circuit means for manually generating said correction control signals whereby said reference setting may be moved in discrete steps in either direction within said range.

4. Apparatus as in claim 2 and further including buffer means coupled to said correction circuit means and to said digital logic means, said buffer means inhibiting the generation of said correction control signals until a predetermined number of cycles of said cyclic perturbations have occured.

5. Apparatus as in claim 1 wherein said further means comprises:
- (a) a bistable circuit coupled to said at least one output of said comparator and adapted to be switched from a first state to a second state when said binary word representative of said changed reference setting exceeds said binary word representative of said predetermined limit; and
- (b) gating means coupled to the output of said bistable circuit for passing updating pulses modifying said reference setting only when said bistable circuit is in its first state.

6. Apparatus as in claim 4 wherein said buffer means comprises:
- (a) a digital counter having a plurality of outputs;
- (b) a coincident circuit having a plurality of inputs and an output;
- (c) switch means coupling the output of said digital counter to said inputs of coincident circuit;
- (d) a flip-flop having a set and a reset state, a toggle input terminal coupled to said output of said coincident circuit and an output terminal; and
- (e) means for advancing said digital counter at the end of each perturbation cycle, the arrangement being such that said flip-flop is set when the number of said perturbation cycles reaches a value established by said switch means.

7. Apparatus as in claim 6 and further including means coupling the output terminal of said flip-flop to said means for changing said control parameter.

* * * * *